US012263861B1

(12) United States Patent
Innocenzi et al.

(10) Patent No.: US 12,263,861 B1
(45) Date of Patent: Apr. 1, 2025

(54) AUTOMATIC TRAINING ASSIGNMENT BASED ON OPERATOR BEHAVIOR

(71) Applicant: Samsara Inc., San Francisco, CA (US)

(72) Inventors: Michael Luis Innocenzi, San Francisco, CA (US); Wendy Greenberg, Atlanta, GA (US); Mark Bennett, Oakland, CA (US); Arthur Huang, San Francisco, CA (US); Miranda Huey, El Dorado Hills, CA (US); Scott McConnell, Berwyn, PA (US); Karthikeyan Kailasam, Aurora, IL (US); Prajakti Jinachandran, San Francisco, CA (US); Laura Forero, Austin, TX (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/664,773

(22) Filed: May 15, 2024

(51) Int. Cl.
G08B 23/00 (2006.01)
B60W 40/09 (2012.01)
(Continued)

(52) U.S. Cl.
CPC ............ B60W 50/14 (2013.01); B60W 40/09 (2013.01); B60W 2040/0818 (2013.01);
(Continued)

(58) Field of Classification Search
CPC .................. B60W 50/14; B60W 40/09; B60W 2040/0818; B60W 2050/146; B60W 2540/229; B60W 2555/60
(Continued)

(56) References Cited

U.S. PATENT DOCUMENTS 6,737,963 B2   5/2004   Gutta et al.
9,542,847 B2   1/2017   Sherony et al.
(Continued)

FOREIGN PATENT DOCUMENTS

KR   20180047149   5/2018

OTHER PUBLICATIONS

"Unprecedented Visibility More Platform Power Everything You Need to Know From the Vision 24 Motive Innovation Summit", [Online]. Retrieved from the Internet: https: gomotive. com blog vision-24-product-announcements , (Apr. 10, 2024), 13 pgs.
(Continued)

Primary Examiner — Anh V La
(74) Attorney, Agent, or Firm — Schwegman Lundberg & Woessner, P.A.

(57) ABSTRACT

Methods, systems, and computer programs are presented for the assignment of courses based on driver behavior. One method includes monitoring driver behavior and analyzing reported events to generate course recommendations. These recommendations are based on configurable rules set by a fleet manager. A safety inbox user interface (UI) allows for the review of events and the assignment of one or more courses to a driver. The method further includes recording the assigned course as pending, notifying the driver, updating the driver application to reflect the course requirement, detecting course completion by the driver, and updating the Safety Behavior Management System (BMS) with the course completion record. This systematic approach ensures that drivers are aware of and complete necessary educational courses to improve driving safety and adherence to fleet standards.

20 Claims, 19 Drawing Sheets

(51) Int. Cl.
*B60W 50/14* (2020.01)
*B60W 40/08* (2012.01)

(52) U.S. Cl.
CPC . *B60W 2050/146* (2013.01); *B60W 2540/229* (2020.02); *B60W 2555/60* (2020.02)

(58) Field of Classification Search
USPC .................. 340/576, 573.1, 438, 439, 457
See application file for complete search history.

(56) References Cited

U.S. PATENT DOCUMENTS

| | | | |
|---|---|---|---|
| 10,155,445 | B2 | 12/2018 | Nemat-Nasser |
| 10,173,685 | B2 | 1/2019 | Schaper et al. |
| 10,272,838 | B1 | 4/2019 | Pertsel |
| 10,745,009 | B2 | 8/2020 | Jang et al. |
| 11,318,949 | B2 | 5/2022 | El Kaliouby et al. |
| 11,352,013 | B1 | 6/2022 | Srinivasan et al. |
| 11,386,325 | B1 | 7/2022 | Srinivasan et al. |
| 11,615,141 | B1 | 3/2023 | Hoye et al. |
| 11,830,259 | B2 | 11/2023 | Ren et al. |
| 11,989,949 | B1 | 5/2024 | Mazumder et al. |
| 11,993,277 | B2 | 5/2024 | Julian et al. |
| 12,056,922 | B2 | 8/2024 | Tsai et al. |
| 12,112,555 | B1 | 10/2024 | Lee et al. |
| 2007/0159311 | A1 | 7/2007 | Schober |
| 2012/0147189 | A1 | 6/2012 | Zhang |
| 2012/0206252 | A1 | 8/2012 | Sherony et al. |
| 2017/0001520 | A1 | 1/2017 | Nemat-nasser |
| 2018/0170375 | A1 | 6/2018 | Jang et al. |
| 2019/0310654 | A1 | 10/2019 | Halder |
| 2019/0389487 | A1 | 12/2019 | Gowda et al. |
| 2020/0125861 | A1 | 4/2020 | Sota et al. |
| 2020/0228646 | A1 | 7/2020 | Hotes et al. |
| 2020/0342235 | A1 | 10/2020 | Tsai et al. |
| 2021/0179092 | A1 | 6/2021 | Chen et al. |
| 2022/0013014 | A1 | 1/2022 | Xu et al. |
| 2022/0126864 | A1 | 4/2022 | Moustafa et al. |
| 2022/0289203 | A1* | 9/2022 | Makilya .................. G06V 20/59 |
| 2022/0324467 | A1 | 10/2022 | Alvarez et al. |
| 2023/0065491 | A1 | 3/2023 | Ren et al. |
| 2023/0112797 | A1 | 4/2023 | Sicconi et al. |
| 2023/0154204 | A1* | 5/2023 | Kahn .................... G06V 20/44 382/104 |
| 2023/0219592 | A1 | 7/2023 | Calmer et al. |
| 2023/0298410 | A1 | 9/2023 | Calmer et al. |
| 2023/0303101 | A1* | 9/2023 | Kuehnle .................. G08G 1/20 |
| 2023/0419688 | A1 | 12/2023 | Saggu |
| 2024/0053763 | A1 | 2/2024 | Halder |
| 2024/0062667 | A1* | 2/2024 | Kemble .................. G06F 18/22 |
| 2024/0096116 | A1 | 3/2024 | Alpert et al. |
| 2024/0177498 | A1 | 5/2024 | Pittner et al. |
| 2024/0198180 | A1* | 6/2024 | Chen .................... G06F 40/40 |
| 2024/0208522 | A1* | 6/2024 | Verma .................. B60W 40/09 |
| 2024/0219716 | A1 | 7/2024 | Chen et al. |

OTHER PUBLICATIONS

"U.S. Appl. No. 18/643,164, Ex Parte Quayle Action mailed Jul. 15, 2024", 7 pgs.

"U.S. Appl. No. 18/634,353, Notice of Allowance mailed Jul. 17, 2024", 9 pgs.

"U.S. Appl. No. 18/643,164, Notice of Allowance mailed Aug. 12, 2024", 5 pgs.

"U.S. Appl. No. 18/672,665, Non Final Office Action mailed Aug. 23, 2024", 8 pgs.

"U.S. Appl. No. 18/750,793, Non Final Office Action mailed Aug. 30, 2024", 15 pgs.

"U.S. Appl. No. 18/672,665, Response filed Nov. 6, 2024 to Non Final Office Action mailed Aug. 23, 2024", 17 pgs.

"U.S. Appl. No. 18/643,164, Corrected Notice of Allowability mailed Nov. 12, 2024", 2 pgs.

"U.S. Appl. No. 18/750,793, Response filed Nov. 21, 2024 to Non Final Office Action mailed Aug. 30, 2024", 16 pgs.

"U.S. Appl. No. 18/923,359, Non Final Office Action mailed Dec. 5, 2024", 8 pgs.

"U.S. Appl. No. 18/808,818, Non Final Office Action mailed Nov. 26, 2024", 11 pgs.

U.S. Appl. No. 18/634,353 U.S. Pat. No. 12,112,555, filed Apr. 12, 2024, Drowsy Driving Detection.

U.S. Appl. No. 18/808,818, filed Aug. 19, 2024, Drowsy Driving Detection.

U.S. Appl. No. 18/672,665, filed May 23, 2024, Monitoring the Safe Distance Between Vehicles While Driving (As amended).

U.S. Appl. No. 18/750,793, filed Jun. 21, 2024, Forward Collision Warning.

U.S. Appl. No. 18/643,164 U.S. Pat. No. 12,165,393, filed Apr. 23, 2024, Lane Departure Monitoring.

U.S. Appl. No. 18/923,359, filed Oct. 22, 2024, Lane Departure Monitoring.

* cited by examiner

| ⊘ TAGS | EVENT TYPE ▽ | COACH ▽ | DUE DATE ▽ | COACHING TYPE ▽ | | | |
|---|---|---|---|---|---|---|---|
| DRIVER | SCORE ⊙ | BEHAVIORS TO COACH | | LAST COACHED | ASSIGNED COACH | COACHING TYPE | |
| JOE PEREZ | 98 | FOLLOWING DISTANCE (31) NO SEAT BELT (2) ROLLING STOP | | 8 MONTHS AGO | (E) JOHN DOE | WITH MANAGER ▽ | COACH |
| APO SMITH | 90 | FOLLOWING DISTANCE (5) NO SEAT BELT (3) ROLLING STOP | | 1 WEEK AGO | (M) JANE SMITH | WITH MANAGER ▽ | COACH |
| ARMANDO GARCIA | 94 | NO SEAT BELT (3) FOLLOWING DISTANCE (2) FORWARD COLLISION WARNING ROLLING STOP | | 3 WEEKS AGO | (M) MIKE PEREZ | WITH MANAGER ▽ | COACH |
| ART SMITH | 99 | NO SEAT BELT (7) | | 5 MONTHS AGO | (E) JUANA GARCIA | WITH MANAGER ▽ | COACH |

COACHING SESSION

Ⓐ JOE PEREZ  [94]

○ FOLLOWING DISTANCE  2
  ○ FORWARD COLLISION WARNING  1
  ○ ROLLING STOP  1
  ○ NO SEAT BELT  3
SUMMARY

BEHAVIOR NOTES  +

FOLLOWING DISTANCE — 802

⊙ BEHAVIOR LAST COACHED 3 MONTHS AGO ▷
⊙ COACHING TYPE: WITH MANAGER ▷
⚠ EXCEEDED 2 IN-CAB ALERT THRESHOLD

✦ SAFETY TIP

804 — IT'S DANGEROUS TO FOLLOW THIS CLOSELY BEHIND THE VEHICLE AHEAD. WITH A FOLLOWING DISTANCE OF LESS THAN 4 SECONDS, YOU MAY NOT HAVE TIME TO REACT TO CHANGING ROAD CONDITIONS. AIM FOR A FOLLOWING DISTANCE OF OVER 4 SECONDS AND ALWAYS LEAVE YOURSELF AN OUT. DON'T GET BOXED IN WHEN OTHER DRIVERS ARE SELECTING THEIR LANES. IF YOU SEE BRAKE LIGHTS UP AHEAD, YOU SHOULD SIGNAL THE SLOWDOWN TO DRIVERS BEHIND YOU BY APPLYING YOUR BRAKES WITHIN 2 SECONDS

EVENTS   SORT: NEWEST ▽                               1 OF 2 EVENTS ⌄ ⌃

806 — ⊕ RESTRICTED CONTENT              ⊕ RESTRICTED CONTENT            ⋯
      [REQUEST ACCESS]                    [REQUEST ACCESS]              [DISMISS EVENT]

NOV 22, 6:54 PM                         MAY 18, 11:09 AM
✓ SEEN BY DRIVER                        ✓ SEEN BY DRIVER              ✓ SEEN ON DEC 5, 5:56AM

808 — FOLLOWING DISTANCE
NOV 22, 2023 6:54 PM EST • 885 RMC LB STEPVAN         6:54:14 PM EDT

[49 MPH]

COACH: MICHAEL INNOCENZI                                  [MARK BEHAVIOR AS COACHED]

[END SESSION]

FIG. 8

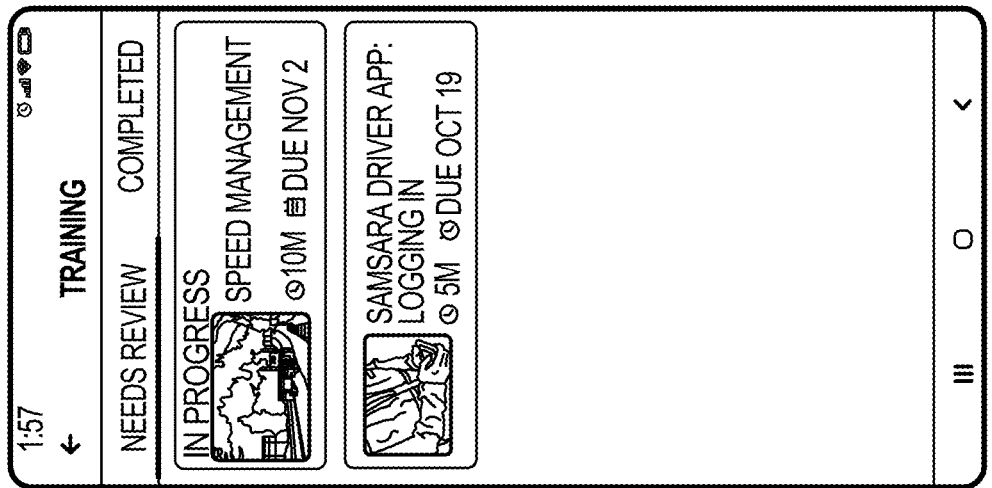
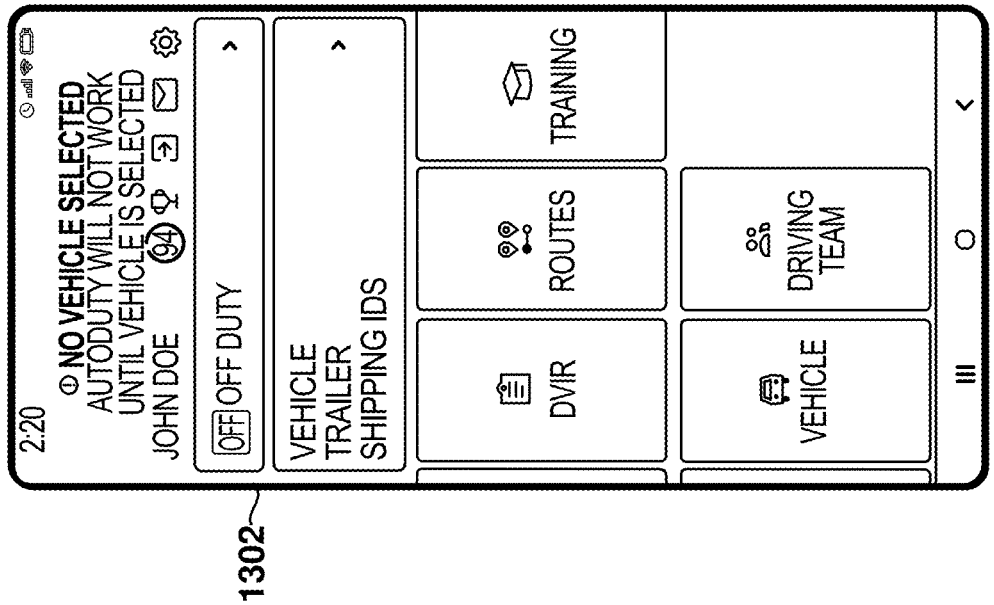
FIG. 13

1602

```
                    SUPERUSER ▽
    ┌─────────────────────────────────────────────┐
    │ SAFETY                              X  ▽    │
    └─────────────────────────────────────────────┘
    COURSE THUMBNAIL (OPTIONAL)

DRIVER DISTRACTIONS .PNG, 0 B         REMOVE

ESTIMATED TIME TO COMPLETE
    ┌──────────────┐
    │ 10   MINS    │
    └──────────────┘

RELATED BEHAVIORS (OPTIONAL)
    ┌─────────────────────────────────────────────┐
    │ [× INATTENTIVE DRIVING][× EATING/DRINKING][× SMOKING] │
    │ [× INATTENTIVE DRIVING][× EATING][× DRINKING]  X ▽   │
    │                                             │
    └─────────────────────────────────────────────┘

ACCESS
    LOCALE
    ┌─────────────────────────────────────────────┐
    │ [× CANADA][× MEXICO][× UNITED STATES]  X ▽  │
    └─────────────────────────────────────────────┘

FEATURE CONFIG (OPTIONAL)
    ┌─────────────────────────────────────────────┐
    │ SAFETY TRAINING                     X  ▽    │
    └─────────────────────────────────────────────┘

COURSE FILE UPLOAD
    COURSE FILE
    UPLOAD SCORM, AICC, XAPI OR CMI5 COURSES USING A .ZIP FILE

DRIVER DISTRACTIONS.ZIP, 0 B          REMOVE
```

FIG. 16

AUTOMATIC TRAINING ASSIGNMENT BASED ON OPERATOR BEHAVIOR

TECHNICAL FIELD

The subject matter disclosed herein generally relates to methods, systems, and machine-readable storage media for vehicle safety technologies, including methods, systems, and machine-readable storage media for monitoring operator behavior to enhance safety protocols.

BACKGROUND

Workers in physical operations perform complicated and dangerous tasks, such as commercial truck driving or forklift operations. Employers go to great lengths to ensure workers receive substantial training to perform this work safely and efficiently. Training is typically conducted at regularly scheduled intervals, such as during orientation and monthly or quarterly refreshers.

Typically, customers engage in driver training through classroom sessions or periodic intervals. For instance, when a new group of twenty drivers joins, they undergo training either in a classroom setting or via computer-based courses. Subsequently, these drivers venture into the field, with refresher training sessions scheduled every six months.

When workers engage in undesirable behaviors like speeding or maintaining a close following distance, formal training is frequently overlooked. Formal coaching sessions are often reserved for serious events due to manager bandwidth constraints and because training systems and systems that monitor worker behavior are different. This lack of adequate training can ultimately culminate in accidents, leading to increased claims and insurance expenses for the employer.

BRIEF DESCRIPTION OF THE DRAWINGS

Various appended drawings illustrate examples of the present disclosure and cannot be considered limiting its scope.

FIG. 7 illustrates an example user interface for a performance tracking and coaching system.

FIG. 8 shows a UI for an interactive coaching session according to some examples.

FIG. 13 shows interfaces of the driver mobile app, according to some examples.

FIG. 16 shows a UI for configuring the assignment of courses based on behavior, according to some examples.

DETAILED DESCRIPTION

Figure 1:
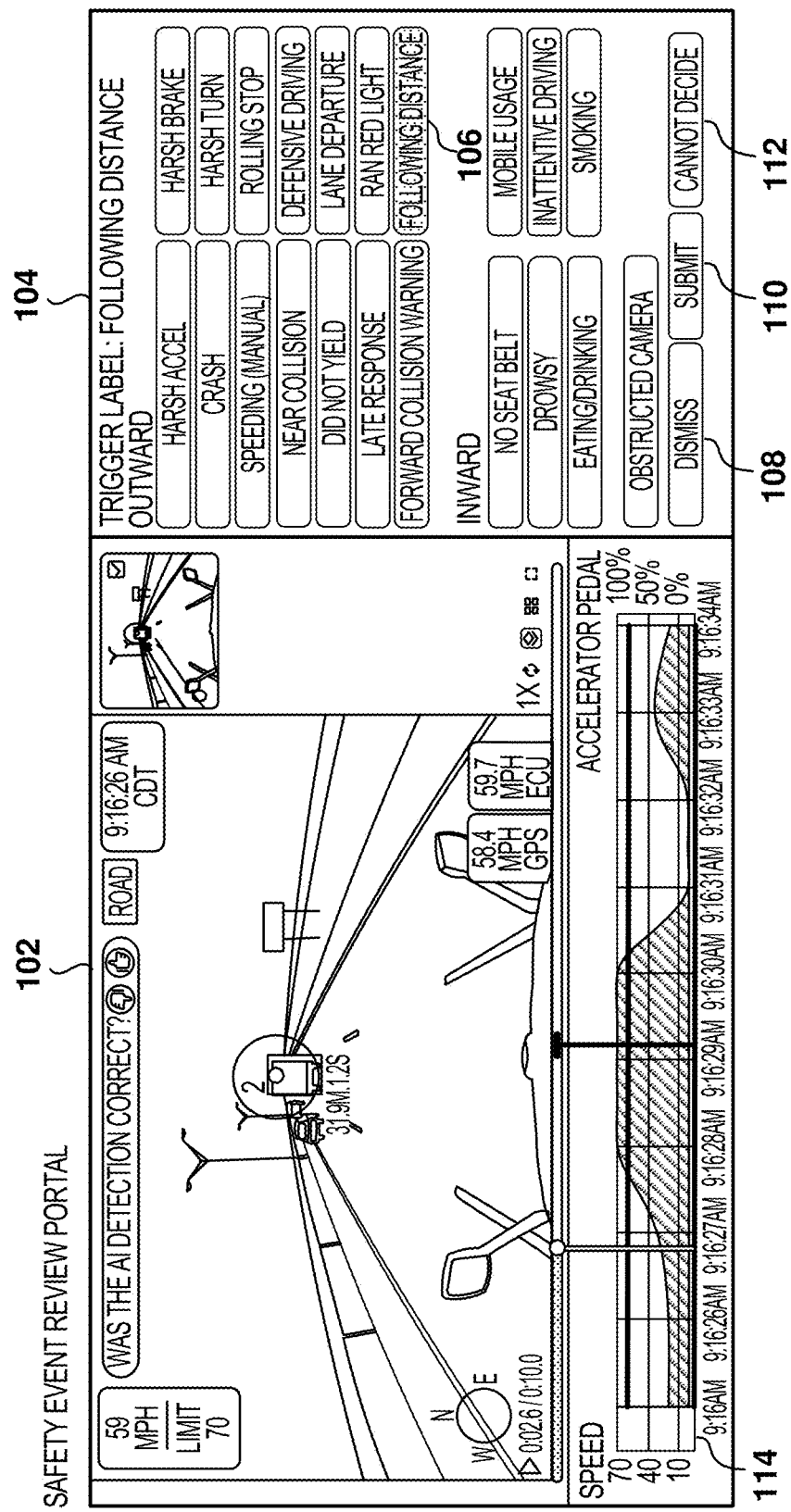
FIG. 1 is a user interface (UI) for reviewing behavior events, according to some examples.

Example methods, systems, and computer programs are directed to the enrollment of drivers in courses based on driver behavior detected based on specified criteria and vehicle data. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

The presented solutions enable fleet managers to seamlessly assign safety training to drivers while reviewing safety events in a Behavioral Monitoring System (BMS), which includes a safety inbox and a coaching portal. Further, drivers can easily complete training using the BMS mobile app. Further, BMS analyzes received behavior events (e.g., speeding on the freeway) and is able to provide recommendations on training courses that will allow drivers to improve safety on the road. Additionally, the BMS may automatically assign courses to drivers based on criteria that includes the frequency of behavioral events detected.

Enhancement of driver safety and minimization of incident-related expenses can be achieved by facilitating the assignment of training courses during the examination of safety events in the inbox or coaching interfaces. This process enables drivers to amend their driving practices and augment their safety on the road.

Efficiency is improved for both trainers and drivers by permitting certain behaviors to be addressed through remote training. This approach diminishes the necessity for arranging and conducting face-to-face training sessions, thereby conserving time for trainers with demanding schedules and drivers.

Simplifying the completion of training programs streamlines driver onboarding and compliance. Moreover, intuitive reporting systems make tracking training completion more user-friendly, accelerating the process of bringing drivers to operational readiness.

Methods, systems, and computer programs are presented for the assignment of courses based on driver behavior. One method includes monitoring driver behavior and analyzing reported events to generate course recommendations. These recommendations are based on configurable rules set by a fleet manager. A safety inbox user interface (UI) allows for the review of events and the assignment of one or more courses to a driver. The method further includes recording the assigned course as pending, notifying the driver, updating the driver application to reflect the course requirement, detecting course completion by the driver, and updating the Safety Behavior Management System (BMS) with the course completion record. This systematic approach ensures that drivers are aware of and complete necessary educational courses to improve driving safety and adherence to fleet standards.

Glossary of Terms

Some of the concepts used for the description of the solution are presented below.

A rule is a predefined set of instructions used to analyze one or more events and perform a task in response to the one or more events. The instructions include one or more conditional checks based on the event data to decide which action or actions to perform.

A single-factor rule, also referred to as a basic rule, is used to determine the task to be performed (e.g., assigning a training course to a driver) based on events of one type (e.g., speeding) and includes triggering conditions. The triggering conditions include one or more of a single occurrence, a minimum number of events happening over a predetermined period (e.g., three speeding events within a week), a frequency of occurrence (e.g., two unsafe-lane departures a week for three consecutive weeks, etc. In one example, a basic rule is associated with a type of event, a number of occurrences, and a period of time, but other rules may include different triggering parameters.

A compound rule is a rule that combines two or more basic rules according to configurable combining logic. The combining logic may include any logic operator, such as logical AND, logical OR, or a combination thereof. As with basic rules, the compound rule may include associated parameters related to frequency, number of events, and time periods. For example, a compound rule may trigger when two events of drowsy driving are detected with two events of unsafe lane departure within the same hour, which may indicate that the driver is fatigued and should stop for rest.

FIG. 1 is a user interface (UI) for reviewing behavior events, according to some examples. It illustrates an exemplary user interface of a Safety Event Review Portal for monitoring and reviewing vehicle safety events. The interface is divided into three sections: a video playback area 102, an event timeline 114, and a trigger label panel 104.

The video playback area 102 displays recorded footage of the vehicle's surroundings captured by onboard cameras. This area includes overlaid graphics, such as bounding boxes that indicate the detection of objects, such as the vehicle in front. Additional information, such as vehicle speed, is displayed alongside the video feed.

Below the video playback area is the event timeline 114, which provides a graphical representation of the vehicle's speed over time and highlights the duration of the safety event. The event timeline 114 includes a playback scrubber that allows users to navigate through the recorded event. By moving the position of the scrubber along the timeline, users can pinpoint and view specific moments in time within the video. The data presented within the event timeline 114, such as vehicle speed or other telematics, corresponds directly to the content being displayed in the video at that particular moment.

The trigger label panel 104 is organized into three sections, each with interactive elements for categorizing the nature of the safety event. According to certain examples, the first section includes outward-facing events such as harsh acceleration, crash, and following distance 106, and the second section lists inward-facing events that may involve the driver, including, but not limited to: no seat belt usage, drowsiness, and mobile usage.

According to certain examples, the third section contains action buttons for categorizing the event. The action buttons include a dismiss button 108, a submit button 110, and a cannot decide button 112. The dismiss button 108 is for dismissing the event because the review showed that the respective event did not really happen (e.g., the driver was not following too closely. This dismissal is referred to herein as a false positive. The submit button 110 is to confirm that the event happened, referred to herein as a true positive.

When the event is dismissed, the dismissed event will not be shown to the end user, which saves time for the end user, so the end user does not have to waste time inspecting false positives. When the event is not dismissed, the event will be reported to the end user.

In some examples, the data on driver behavior is used to plan training for drivers and other types of machinery operators. The BMS analyzes behavioral events associated with driving errors and provides training recommendations to correct undesired behaviors. Unlike other systems where users have to switch between platforms to assign training after reviewing camera events, BMS streamlines the process by integrating behavior-based training directly with coaching and training. This approach ensures drivers receive timely training to correct their behavior, reducing the risk of accidents and associated costs.

Figure 2:
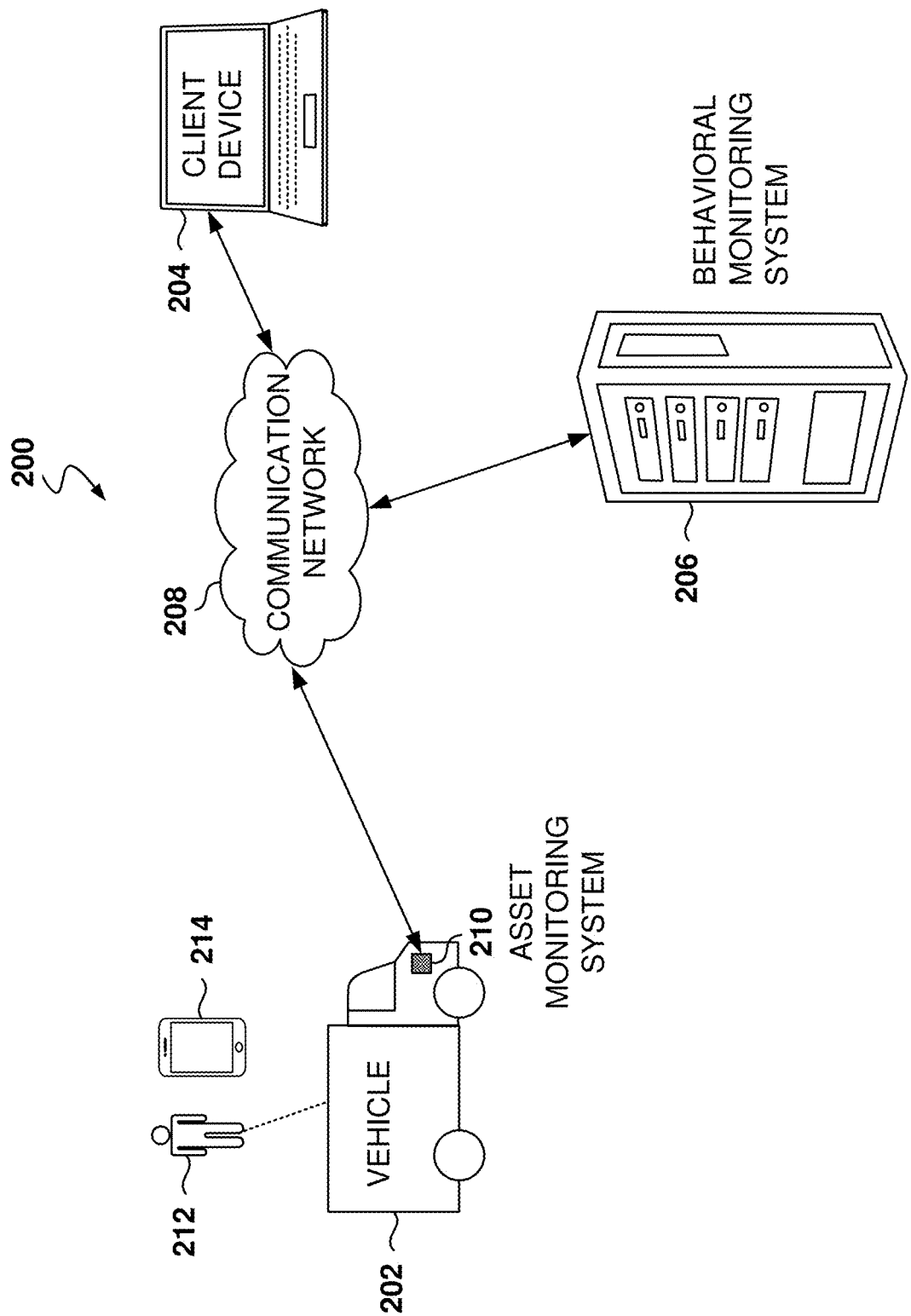
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

According to certain examples, the vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208.

The AMS 210 may include one or more hardware devices to perform monitoring functions at the vehicle. In some examples, the AMS 210 includes a communications device that is a hardware device that acts as a network access point for the AMS 210. For example, the communications device can be established as an edge device of a network or system of nodes within the vehicle 202.

The AMS may include a variety of sensors, computing devices (e.g., electronic control units (ECUs), actuators, etc., deployed within the vehicle. According to certain examples, the AMS may encompass a variety of sensors, including speed sensors for monitoring vehicle velocity, accelerometers, and gyroscopes for detecting changes in motion and orientation, and cameras for visual data acquisition to support functions like lane departure detection. It may also employ radar and LIDAR sensors for distance measurements (i.e., for adaptive cruise control), temperature sensors for monitoring engine and cabin conditions, pressure sensors for system diagnostics such as tire and hydraulic pressures, and fuel level sensors for managing refueling schedules and efficiency calculations. The communications device in the AMS facilitates wireless communication capabilities by connecting to wireless networks (e.g., cellular, wireless local area network, satellite communication networks, etc.) for communicating with remote computing devices. The communications device may also provide additional functionality, such as firewall functionality to filter inbound and outbound communications, disallow incoming communications from suspicious or unauthorized sources, etc.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages and interact with any number of client devices 204 and vehicles 202, and support connections from a variety of different types of client devices 204.

According to certain examples, a user interacts with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if detected by one or more sensor devices associated with the behavior monitoring system 206, indicate the use of offensive, derogatory, and otherwise undesirable language. As another example, a triggering condition may define unsafe lane-departure events.

Each triggering condition may also be associated with a corresponding set of response actions to be performed by the behavioral monitoring system 206 if the triggering condition has been satisfied. For example, the response actions may include notifying the driver of a dangerous condition (e.g., drowsy driving, lane departure), transmitting alerts to specified users/user devices, generating incident reports based on corresponding triggering conditions, modifying the mode of operation of sensors or the vehicle, and the like.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior. For example, the user interface enables the administrator to provide inputs to define a modified mode of operation of the sensors in the vehicle 202 to be initiated to capture additional data for inclusion in the incident report. This may include increasing the number of sensors used to capture data, such as by initiating the use of video cameras or microphones, increasing the performance of the sensors that are in use, such as by increasing the resolution used to capture video, and modifying the positioning of the sensors, such as by changing the angle or view of a camera to capture the detected action better.

Further, a driver 212 may interact with the behavioral monitoring system 206 and the AMS 210 via a mobile device 214. A BMS app may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
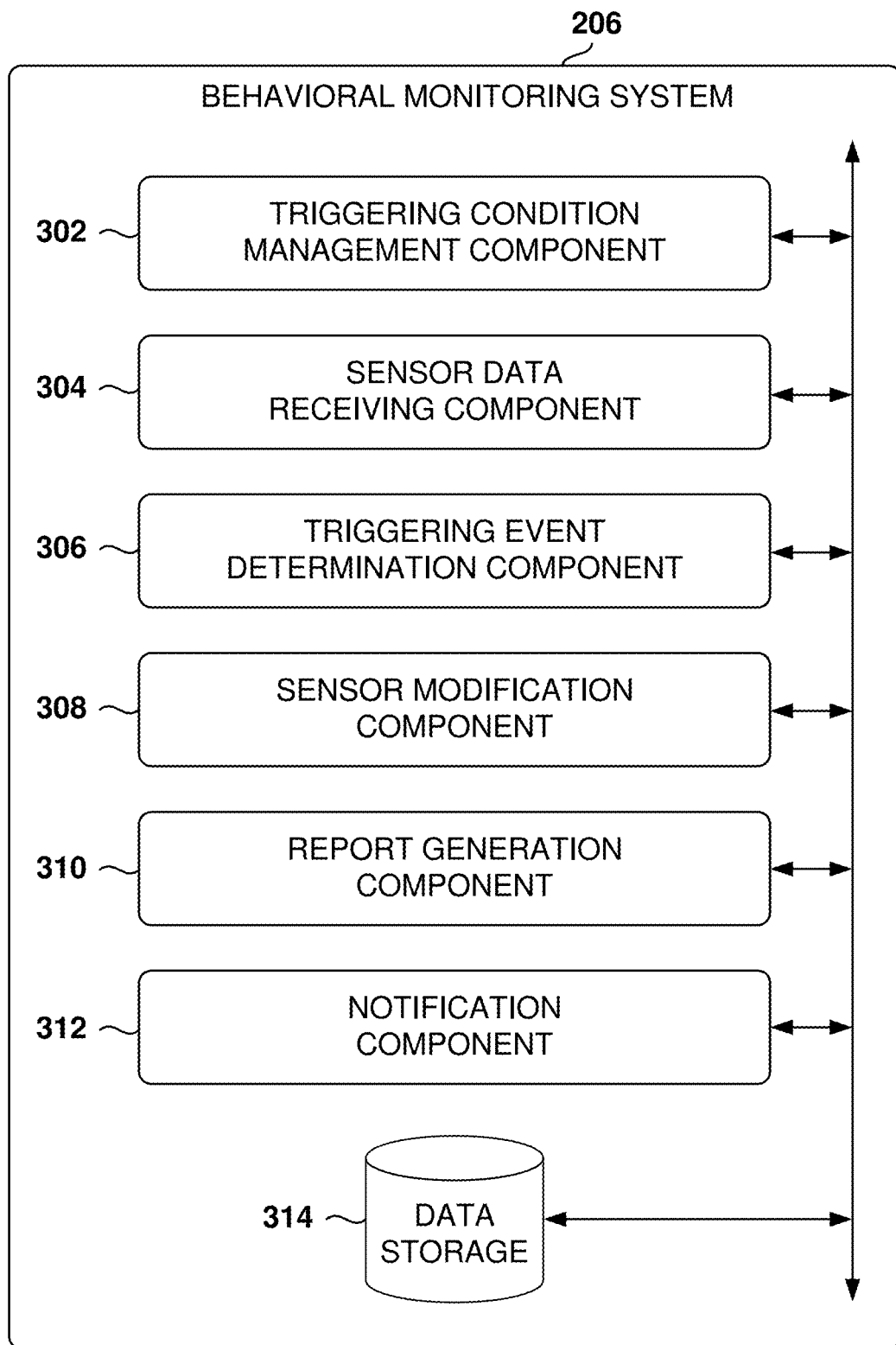
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on one or more of a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions is detected within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
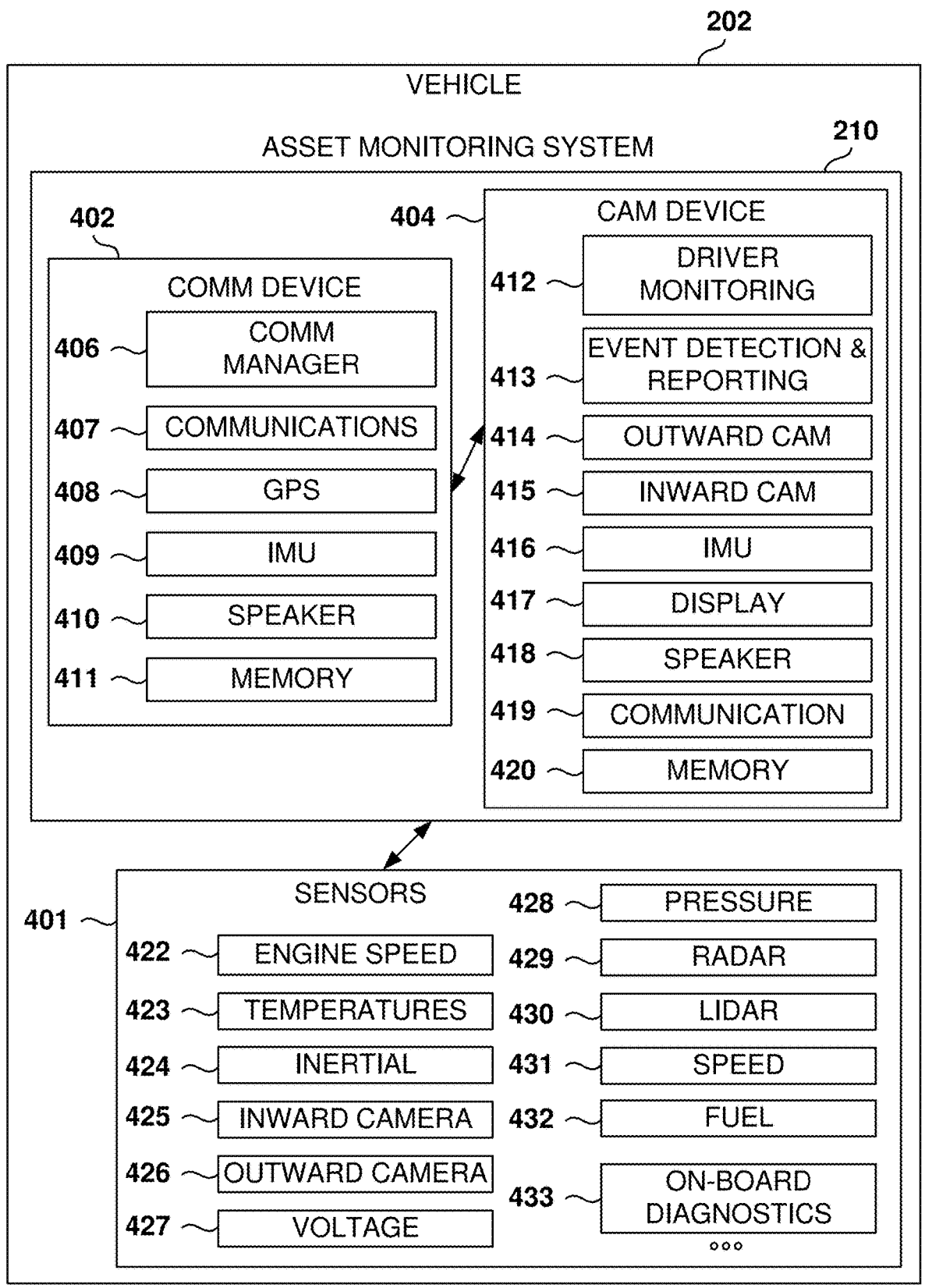
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a comm device 402 and a cam device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, Inertial Measurement Unit (IMU) 409, a speaker 410, computer memory 411 (RAM and permanent storage), and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

In some examples, the cam device 404 includes a driver monitoring 412 module, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring 412 module performs one or more activities regarding driver behavior, such as LD detection, driving while drowsy, following too close, sudden breaking, etc. The event detection and reporting system 413 is configured to identify and log significant events based on sensor data. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models described below, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5:
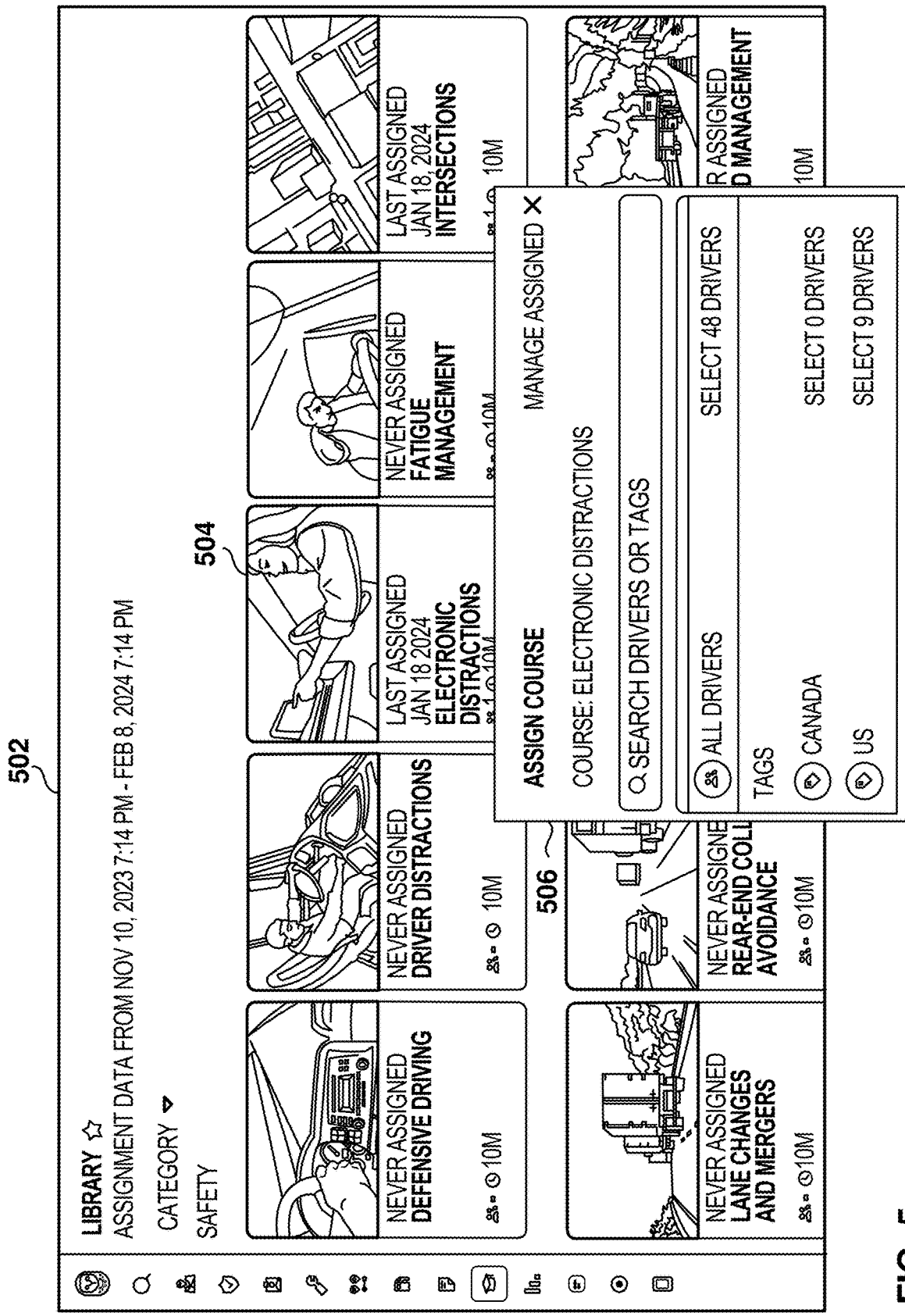
FIG. 5 shows a UI for assigning courses according to some examples.

FIG. 5 shows a UI 502 for a training and assignment management system. The UI 502 is displayed on a computer screen and includes a navigation panel on the left side, which provides access to various system functions.

The main panel of the interface displays a library of training modules 504 categorized under "Safety," with each module represented by a thumbnail image and a title indicating the subject matter of the training, such as Defensive Driving, Driver Distractions, Electronic Distractions, Fatigue Management, Intersections, Lane Changes and Mergers, Rear-End Collision Avoidance, Speed Management, Space Management, and Seatbelts. Some modules display a status indicating whether they have been assigned or not, along with the date of the last assignment, if applicable, and the estimated time required to complete the module.

A dialog box 506 is overlaid when one of the training modules 504 is selected. The dialog box 506 includes the title "Assign course" and provides options for assigning the course to one or more drivers. In this example, the course "Electronic Distractions" has been selected. The dialog box includes a search field for locating drivers or tags and options to select drivers by tags, with some of the options including "All Drivers," "US," "Canada," etc. Additionally, there are buttons to select drivers associated with each tag.

The UI 502 is designed to facilitate the assignment and management of training modules to drivers. It allows for easy tracking of training status and ensures that drivers receive necessary education on various safety topics. The interface also includes a search bar at the top right for quick navigation and a date and time stamp at the top of the library panel indicating the range of assignment data being displayed.

Administrators can remove assignments and modify the due dates as needed. They are also provided with options for previewing the courses.

Training is assigned quickly and efficiently with a single button click. Administrators can configure rules for automatic training assignments based on behavioral events. For example, BMS analyzes speeding events over a specified period and automatically assigns relevant training if the frequency of speeding events exceeds a configurable threshold. One unique advantage of BMS is its ability to comprehend driver behavior, simplify training assignments, and deliver training in a user-friendly manner.

An administrator can assign courses based on specific events, such as a following-distance event where a driver is following too closely. The administrator's decision to assign a course aims to correct the driver's behavior and prevent future occurrences.

When a course is assigned to a driver, the driver will receive a notification in their BMS mobile app. Once assigned, the driver will access the training section within their driver app, which serves as an effective tool for workflow activities such as inspections, document management, and route planning. Within the mobile app, drivers can initiate and complete the training course before proceeding with their daily tasks.

Figure 6:
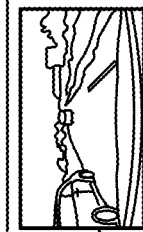
FIG. 6 shows a UI for reviewing behavior events according to some examples.

FIG. 6 shows a UI 602 for reviewing behavior events according to some examples. The UI 602 is for a Safety Inbox that includes the events received by the BMS for the administrator's review. The UI 602 includes a header section at the top indicating the title "Safety Inbox." Below the title, in the illustrated example, a notification bar provides an update message regarding a feature related to Forward Collision Warning, with an option for the user to learn more about the update.

The main portion of the interface displays a list of events 604 for review. Each event 604 is represented by a row containing a thumbnail image, event information, and associated metadata. The events can be further organized by various filters such as "All Events," "Dismissed," and "Starred." Additional filtering options are available, including "Last 7 Days," "Tags," "Event Type," and "More Filters."

A drop-down menu 606 provides multiple options to take based on the event, such as needs review, needs coaching, needs recognition, coached, reviewed, recognized, and dismissed.

Each event 604 entry includes a label such as "Following Distance," indicating the type of event, a timestamp indicating the date and time of the event, and the name of an individual associated with the event.

The UI 602 provides interactive elements such as buttons to dismiss an event or mark it as needing review. Navigation controls for sorting and searching through events, as well as pagination controls, are located at the top right of the list area.

The design of the UI 602 aims to facilitate the monitoring and management of safety-related events within an organizational context, allowing for efficient review and action by administrators responsible for safety oversight. If an event 604 is selected, a page for a detailed review of the event is presented, such as the one illustrated in FIG. 1.

FIG. 7 illustrates an example of UI 702 for a performance tracking and coaching system. The UI 702 includes a display area that presents a list of individuals along with associated performance metrics and coaching information. The display area is divided into several.

The first column, labeled "Driver," lists the names of drivers. Adjacent to the "Driver" column is the "Score" column, which shows numerical values representing the performance scores of each individual.

Following the "Score" column is the "Behaviors to coach" column, which details specific behaviors that have been identified for coaching. This column includes items such as "Following Distance," "No Seat Belt," and "Rolling Stop," among others, with numerical values indicating the frequency or severity of the behavior.

The next column, "Last Coached," indicates the time elapsed since the individual was last coached, with entries such as "8 months ago," "1 week ago," and so forth.

The "Assigned Coach" column displays the names of coaches assigned to each individual, with entries such as "John Doe," "Jane Smith," and others.

Finally, the "Coaching Type" column includes dropdown menus and buttons 704 for setting up a coaching session. The dropdown menus provide options such as "With Manager" and "Shared events."

The UI 702 also includes a header section with filter and sorting options, such as "Tags," "Event Type," "Coach," "Due Date," and "Coaching Type." The overall layout and design of the UI 702 are intended to facilitate easy access to important performance and coaching data, enabling efficient management and improvement of individual behaviors within an organization or system.

Typically, when a coaching session is initialized due to a high number of recent bad events (e.g., seatbelt violations, rolling stop signs, and forward collision warnings), a coaching session is conducted with a manager in person or via conference. During the coaching session this session, recorded events are reviewed with the driver. At the conclusion of the session, the coach may inform the driver that based on the event review and video footage, specific courses will be assigned for the driver to complete at his convenience using the mobile app or some other instrument, such as a web browser executing on a computer.

FIG. 8 shows a UI 802 for an interactive coaching session according to some examples. The UI 802 includes a header section that displays the title "Following Distance" and indicates that the behavior was last coached three months ago by a coaching type with Manager approval. In the illustrated example, the UI 802 also shows that the driver exceeded the in-cab alert threshold.

Below the header, a safety tip section 804 is provided, cautioning the driver about the dangers of following too closely behind another vehicle and offering advice on maintaining a safe following distance under varying road conditions.

The UI 802 also includes an events section 806 for reviewing events. In the illustrated example, the content is restricted, so the user is prompted to request access to view these events. Once permissions are granted, selecting one of the events will open another UI to review the event, such as the UI presented in FIG. 1.

At the bottom of the interface, there is section 808 (the section is truncated, and scrolling down the page would provide complete visibility) for reviewing a specific event related to following too closely. This section includes a visual representation of the vehicle's speed at the time of the event. The interface also includes a section at the bottom presenting the name of the coach responsible for the coaching session.

The coaching process involves conducting sessions either remotely via video teleconference or in-person to review events captured on video. The purpose is to analyze the events and address any issues identified collectively. Following the review, participants are asked to acknowledge the observations and commit to avoiding similar incidents in the future. Subsequently, individuals are assigned specific training modules comprising brief videos and quizzes to assess their understanding. These training materials are designed to reflect real-world driver behavior.

Figure 9:
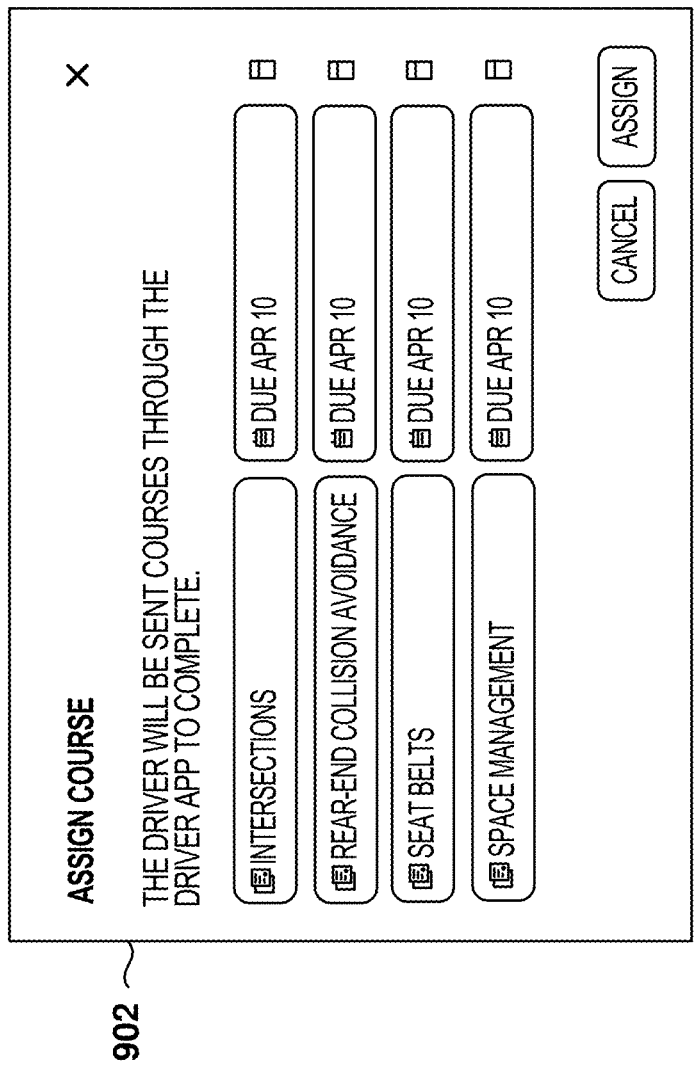
FIG. 9 shows a UI for assigning courses to a driver, according to some examples.

FIG. 9 shows a UI 902 for assigning courses to a driver, according to some examples. The UI 902 is presented in a window overlay format and includes a title area indicating the purpose of the interface, which is to assign courses to a driver. The UI 902 indicates that the driver will receive the courses through a driver application to complete.

Within the UI 902, a list of courses is displayed, each associated with a checkbox to allow selection by the user. The courses listed include "Intersections," "Rear-End Collision Avoidance," "Seatbelts," and "Space Management." Each course is accompanied by a due date, indicating the deadline by which the driver is expected to complete the course.

At the bottom of the interface, two action buttons are provided: one to cancel the operation, labeled "Cancel," and another to confirm the assignment of the selected courses to the driver, labeled "Assign." The overall design of the interface suggests a user-friendly and efficient method for managing driver education and ensuring compliance with training requirements by specified deadlines.

Figure 10:
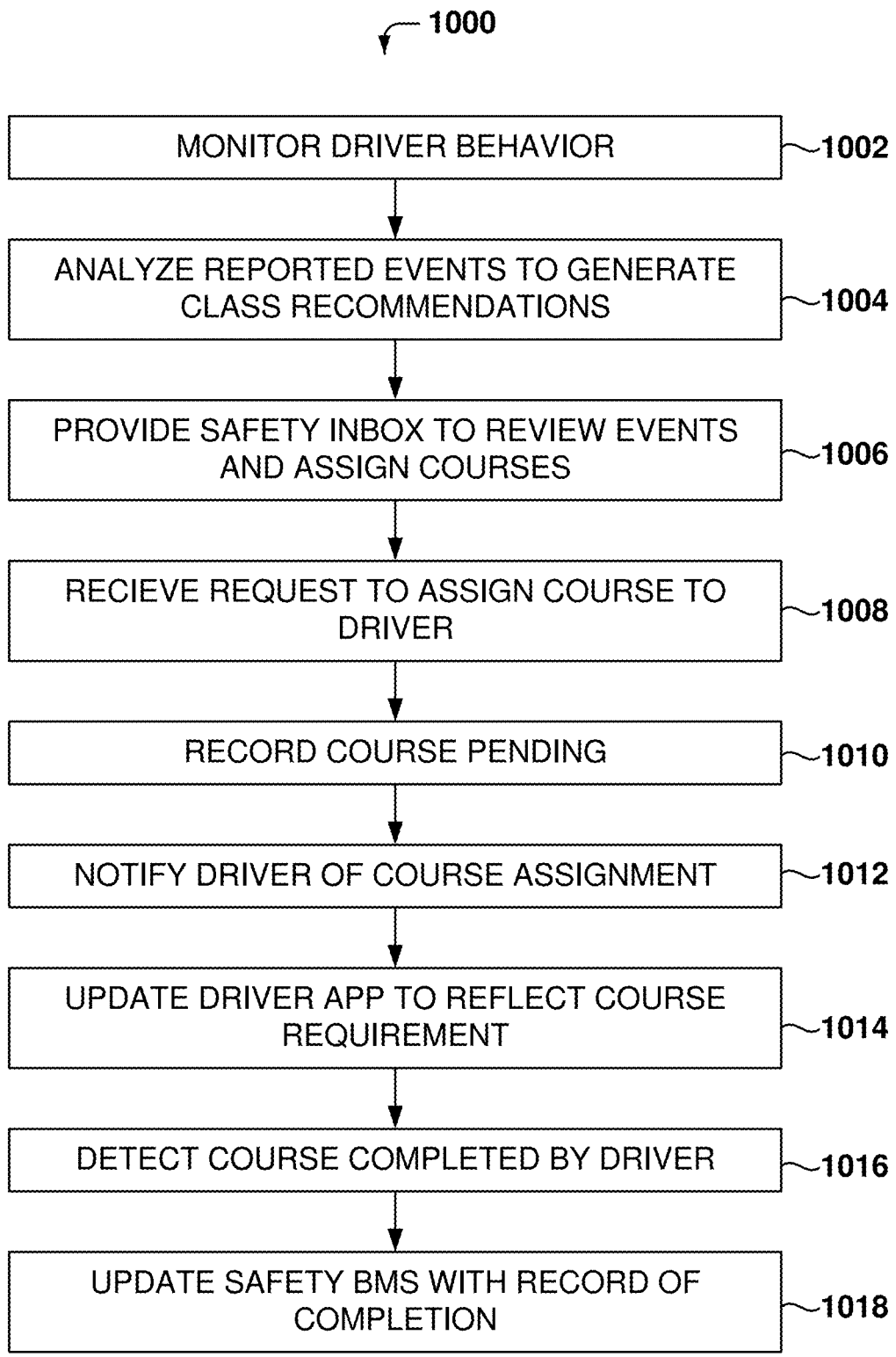
FIG. 10 is a flowchart method for recommending and assigning courses to drivers, according to some examples.

FIG. 10 is a flowchart of a method 1000 for recommending and assigning courses to drivers, according to some examples. While the various operations in this flowchart are presented and described sequentially, one of ordinary skill will appreciate that some or all of the operations may be executed in a different order, be combined or omitted, or be executed in parallel.

Figure 12:
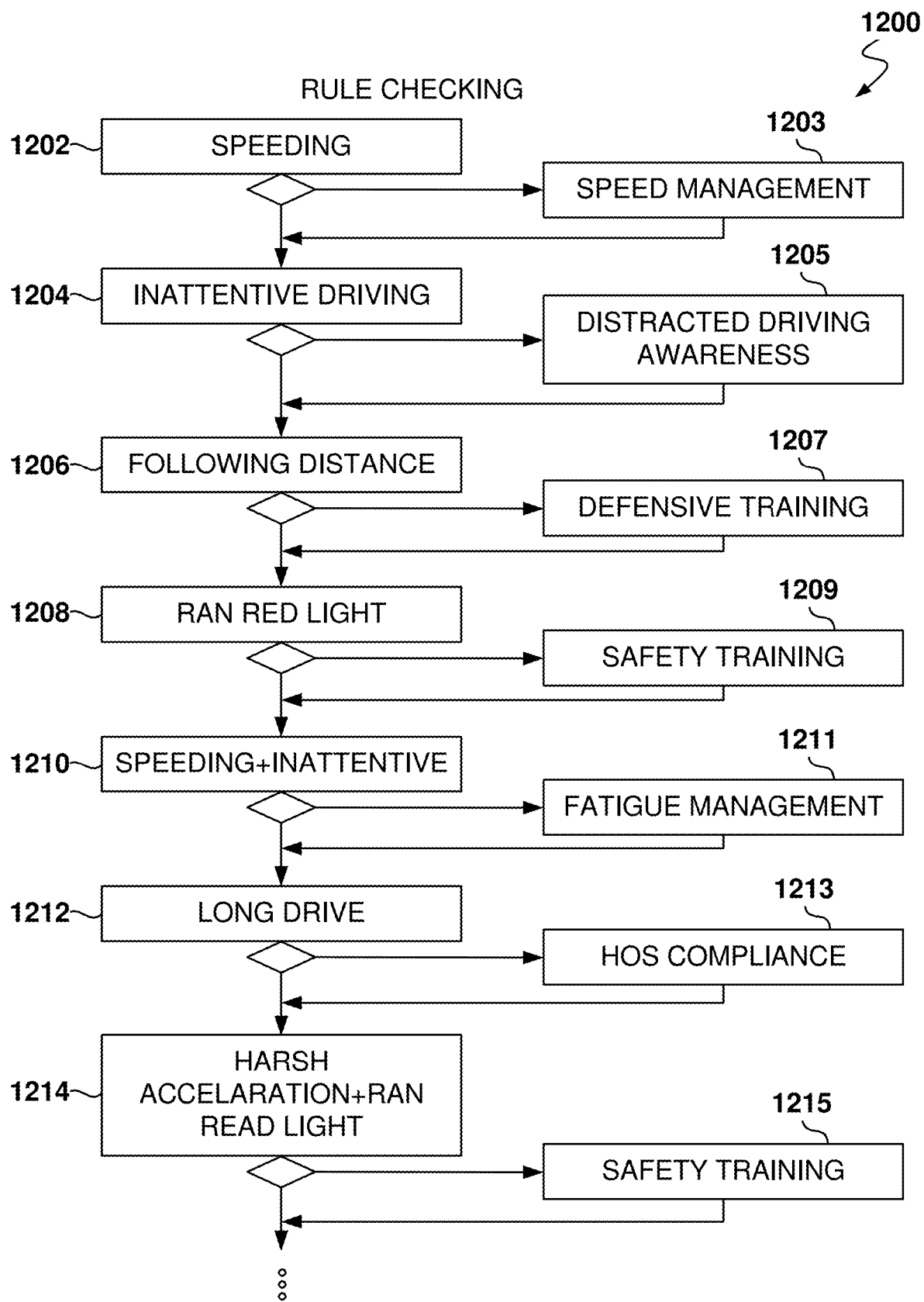
FIG. 12 is a flowchart of a method for checking rules to determine recommended courses based on behavior according to some examples.

Operation 1002 is for monitoring driver behavior. From operation 1002, the method 1000 flows to operation 1004, which involves analyzing reported events to generate class recommendations for the driver. FIG. 12 describes more details on the generation of class recommendations, such as by using rules that are configurable by the fleet manager to trigger the course recommendations.

Once the analysis is complete, operation 1006 provides a safety inbox UI to review events and assign courses accordingly. Subsequently, operation 1008 receives a request to assign a course (or multiple courses) to a driver.

From operation 1008, the method 1000 flows to operation 1010 to record the assigned course as pending. The next operation, 1012, notifies the driver of the course assignment.

To ensure the driver is aware of the requirement, operation 1014 updates the driver application to reflect the course requirement. Following the update, operation 1016 detects when the driver has completed the course.

From operation 1016, the method 1000 flows to operation 1018 for updating the safety Behavior Management System (BMS) with a record of the course completion.

Figure 11:
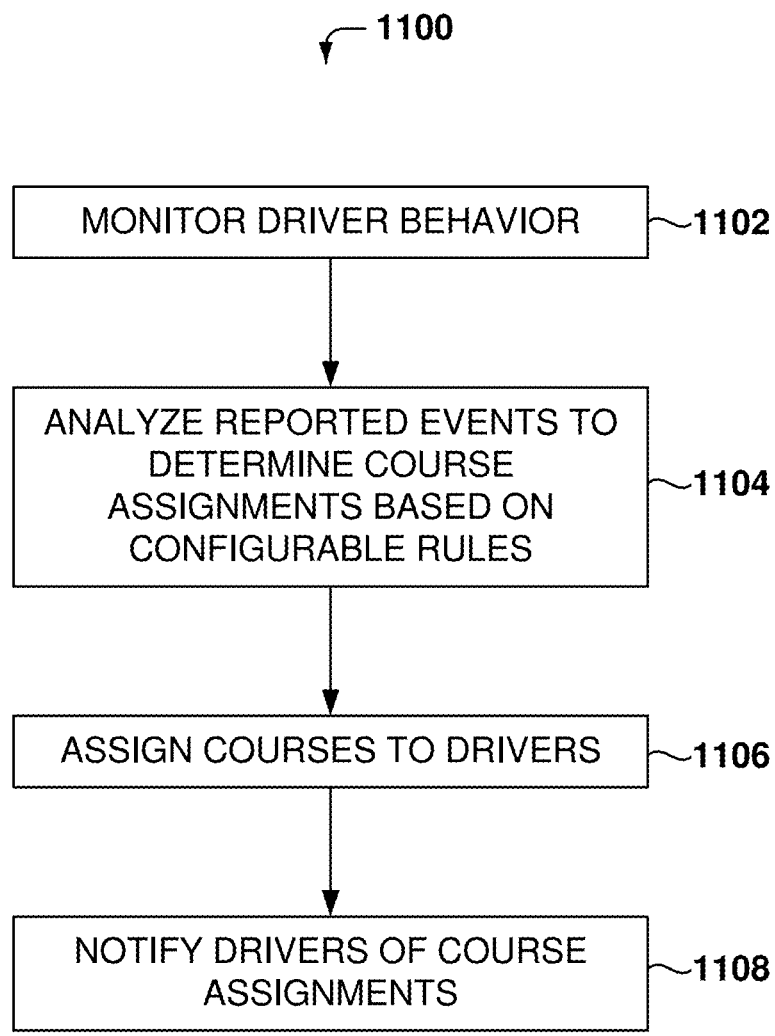
FIG. 11 is a flowchart of a method for the automatic assignment of courses to drivers, according to some examples.

FIG. 11 is a flowchart of a method 1100 for the automatic assignment of courses to drivers, according to some examples. While the various operations in this flowchart are presented and described sequentially, one of ordinary skill will appreciate that some or all of the operations may be executed in a different order, be combined or omitted, or be executed in parallel.

The method of FIG. 10 generates recommendations that are presented to managers for the assignment of courses. The method of FIG. 11 shows the automatic assignment of courses based on detected behaviors without requiring the manager express approval. This simplifies the assignment process by freeing time for the manager since some assignments can be automatically performed.

For instance, if a specific training event occurs multiple times within a set period, the BMS will automatically assign the corresponding training without manual intervention. This automation feature aims to reduce manual workload and can be applied to various types of events. This functionality sets this system apart from other training and learning management platforms due to its data-driven approach.

Operation 1102 is for monitoring driver behavior. Following the monitoring, at operation 1104, the reported events are analyzed to determine course assignments based on configurable rules, as described in more detail with reference to FIG. 12.

Once the analysis is complete, the method 1100 proceeds to operation 1106, where courses are assigned to drivers. Further, at operation 1108, drivers are notified of the course assignments.

FIG. 12 is a flowchart of a method 1200 for checking rules to determine recommended courses based on behavior according to some examples. The flowchart includes a series of operations, each associated with a particular driving behavior and a corresponding recommended course.

A rule is a predefined set of instructions used to analyze one or more events and perform a task in response to the one or more events. The instructions include one or more conditional checks based on the event data to decide which action or actions to perform.

A single-factor rule, also referred to as a basic rule, is used to determine the task to be performed based on events of one type (e.g., speeding) and includes triggering conditions. The triggering conditions include one or more of a single occurrence, a minimum number of events happening over a predetermined period (e.g., three speeding events within a week), a frequency of occurrence (e.g., two unsafe-lane departures a week for three consecutive weeks, etc. In one example, a basic rule is associated with a type of event, a number of occurrences, and a period of time, but other rules may include different triggering parameters.

A compound rule is a rule that combines two or more basic rules according to configurable combining logic. The combining logic may include any logic operator, such as logical AND, logical OR, or a combination thereof. As with basic rules, the compound rule may include associated parameters related to frequency, number of events, and time periods. For example, a compound rule may trigger when two events of drowsy driving are detected with two events of unsafe lane departure within the same hour, which may indicate that the driver is fatigued and should stop for rest.

Depending on the configuration, the triggering or a rule will result in a course recommendation that will be suggested to the administrator or will result in the automatic assignment of the course.

An example of a rule is the requirement to trigger speed management training when five severe speeding events are detected within a five-day period. Another rule could involve two instances of mobile phone usage within a five-day period, leading to the assignment of an electronic-distractions course.

It is noted that the embodiments illustrated in FIG. 12 are examples and do not describe every possible embodiment. Other embodiments may utilize different basic rules, different rule combinations, etc. The embodiments illustrated in FIG. 12 should therefore not be interpreted to be exclusive or limiting, but rather illustrative.

Operation 1202 is associated with the behavior of "Speeding." When this behavior is detected, the flowchart indicates a recommendation for "Speed Management" at operation 1203. In one example, the rule for speeding will be triggered when speeding occurs a plurality of times over a certain period. These parameters are configurable by the administrator, such as two times a day, four times a week, seven times a month, etc.

Operation 1204 corresponds to the rule for "Inattentive Driving." Upon triggering of this rule based on rule parameters (e.g., two inattentive-driving events detected within an hour), the course "Distracted Driving Awareness," as indicated by operation 1205, will be recommended or automatically assigned.

Operation 1206 is linked to the rule for maintaining an inadequate "Following Distance." The triggering of the rule, based on configuration parameters, will result in the recommendation or automatic assignment of the course "Defensive Training," which corresponds to operation 1207.

Operation 1208 is associated with the behavior of having "Ran Red Light." The triggering of the rule, based on configuration parameters, will result in the recommendation or automatic assignment of the course "Safety Training," as shown in operation 1209.

Operation 1210 pertains to the combined behaviors of "Speeding+Inattentive," that is, operation 1210 corresponds to a compound rule that combines speeding events and inattentive events (e.g., one speeding event and one inattentive event detected within a thirty-minutes time window). The triggering of the rule, based on configuration parameters, will result in the recommendation or automatic assignment of the course "Fatigue Management," which corresponds to operation 1211.

Operation 1212 is related to the behavior of a "Long Drive," indicating that the driver has been continuously driving for an extended period without stopping (e.g., five hours). The triggering of the rule, based on configuration parameters, will result in the recommendation or automatic assignment of the course "Hours of Service (HOS) Compliance," which corresponds to operation 1213.

Further, operation 1214 is associated with the combined events of "Harsh Acceleration+Ran Red Light." The triggering of the rule, based on configuration parameters, will result in the recommendation or automatic assignment of the course "Safety Training," as indicated by operation 1215.

The system also monitors fuel usage and assigns drivers fuel efficiency scores. If a driver is idling excessively compared to their peers, the BMS will automatically recommend or assign fuel-usage training to address this behavior.

Some rules may be associated with events that may be triggered for non-drivers. For example, a driver encounters a vehicle issue, such as a flat tire, and submits a corresponding form detailing the defect. This form is then reviewed by a manager, who identifies the defect and assigns the repair task to a maintenance technician or mechanic. In the event that the assigned mechanic lacks the necessary skills to perform the repair, such as tire changing, a training module for this specific task will be assigned to the mechanic.

Another example may be related to courses being assigned to administrators themselves. For example, if the system detects that an administrator is failing to review a large number of events on the Safety Inbox, a course regarding "Configuring the Behavioral Monitoring System" may be recommended or assigned to the administrator.

FIG. 13 shows interfaces of the driver mobile app, according to some examples. The UI 1302 shows a first user interface screen for the driver mobile app, which includes a notification area at the top and a user identification section displaying the name "John Doe" and an off-duty status indicator. The UI 1302 comprises a grid of selectable icons representing different modules or functionalities of the application, including but not limited to "DVIR," "Routes," "Training," "Vehicle," and "Driving Team."

When the driver signs into the driver app, multiple options are provided, such as go on duty, select vehicle, start inspection for vehicle, select trailer, start inspection for trailer, review unassigned hours, certify logs, review training, etc.

The UI 1304 displays a second user interface screen, which is a detailed view of the "Training" module after selecting this option in the UI 1302. This UI 1304 includes a segmented control with tabs for "Needs Review" and "Completed," indicating different sections or statuses of training content. Within the "Needs Review" section, there are individual entries for training items such as "Speed Management" and "Driver App: Logging In," each with a corresponding time estimate for completion and a due date.

Both UIs are designed to facilitate user interaction with the transportation management application, providing easy access to various tasks and information required by users such as drivers, fleet managers, or other personnel involved in transportation operations. The UIs are displayed on a mobile device with a touchscreen, allowing users to navigate and select options directly on the screen.

Drivers can easily complete training in the app. The courses are "mobile-friendly," which means that the courses are designed to be taken on a mobile phone, although they may also be completed on another device, such as a laptop or a tablet. Further, most courses are designed to be completed in ten minutes or less, although some courses may take longer, such as an introductory course for new drivers. When a new training is assigned, the notification is sent to the driver and will show up in the mobile app.

In some examples, the administrator may configure a request for a course to be mandatory and the course will have to be completed before the driver may perform other functions in the app, such as getting instructions for the next trip.

Figure 14:
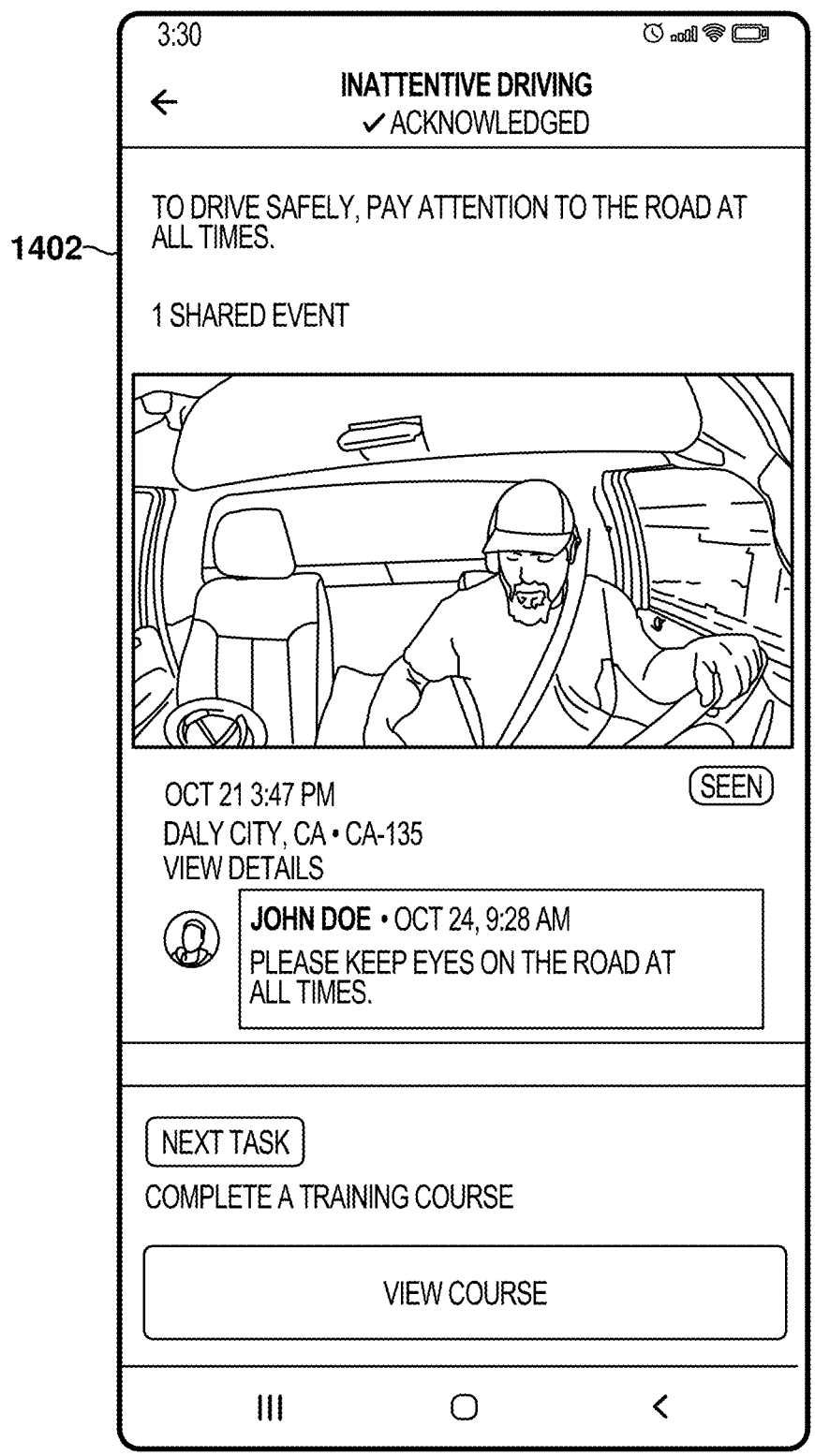
FIG. 14 shows a UI showing the assignment of a course to the driver according to some examples.

FIG. 14 shows a UI 1402 showing the assignment of a course to the driver according to some examples. The UI 1402 is presenting a notification related to "Inattentive Driving," which has been acknowledged by the driver as indicated by a checkmark next to the word "Acknowledged." Below this notification, there is a cautionary message advising the driver to "To drive safely, pay attention to the road at all times."

The interface also includes a section labeled "1 Shared Event," which displays the inattentive-driving event with a timestamp indicating the date, time, and location ("Daly City, CA-CA-135") and an option to "View Details." Below this event, there is a comment from an administrator advising the driver to "Please keep eyes on the road at all times."

At the bottom portion of the interface, there is a call-to-action labeled "Next Task," prompting the driver to "Complete a training course" with a button to "View course."

If the driver selects the option to "View Course," the driver can complete the training in the driver app. Further, the driver will be unable to view training while the selected vehicle is in motion.

Further, the option to review training may be mandatory before the driver can take up other tasks. For example, the administrator may configure that every time the driver signs in, the driver has to review their outstanding training as a reminder. Another administrator may configure the mobile app so the driver has to take the course and not just review the pending courses. In some cases, the driver can be given a deadline, so the driver may use all the options in the app before the deadline expires, but after the deadline expires, the driver will be forced to take the course before getting full access to the driver app. This flexibility allows fleet managers to improve compliance with policies enforced for driver training.

Figure 15:
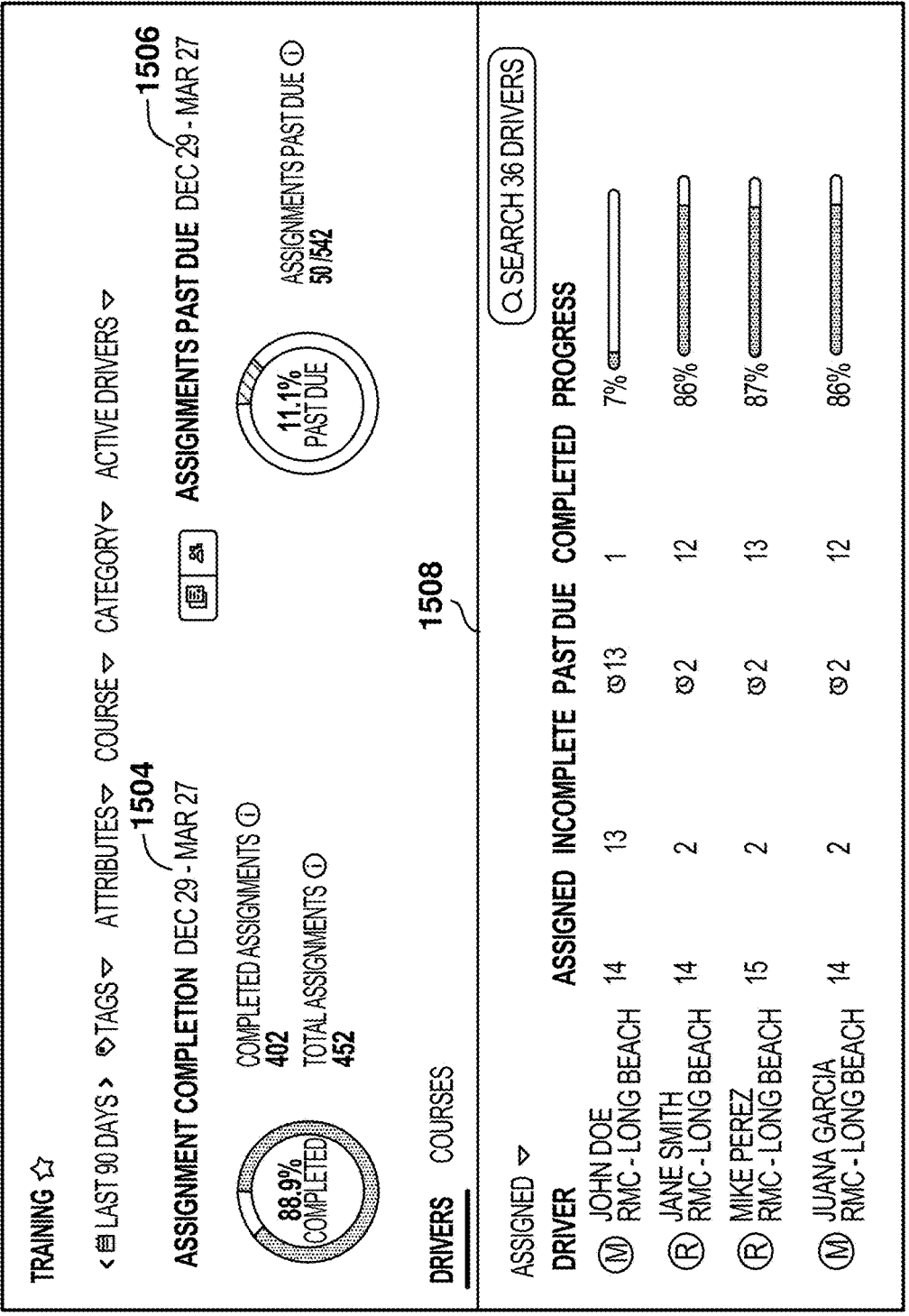
FIG. 15 shows a completions dashboard according to some examples.

FIG. 15 shows a completions dashboard 1502 according to some examples. The BMS may generate multiple reports regarding course completions, efficiency, course coverage for drivers on the fleet, etc. Reports can be generated for individual drivers and for the entire fleet to assess overall performance. This enables the tracking of improvements across the entire fleet based on specific events, coaching, and training. A report on coaching effectiveness is also available for review.

The completions dashboard 1502 includes information about assignment completion 1504 by drivers and assignments past due 1506. The completions dashboard 1502 is organized into several sections to provide a comprehensive overview of training assignments and their completion status.

At the top of the completions dashboard 1502, there is a header section that includes the title indicating that the display pertains to "Training." Below the header, there are filter options that allow a user to refine the displayed data based on various criteria such as time period, tags, attributes, course, category, and active drivers.

The central portion of the completions dashboard 1502 is divided into two main panels. The left panel is for assignment completion 1504 and includes a circular progress chart that visually represents the percentage of completed assignments within a specified time frame. Adjacent to the chart, there are numerical indicators that provide the number of completed assignments as well as the total number of assignments.

The right panel is for assignments past due 1506 and features a second circular progress chart that indicates the percentage of assignments that are past due. This chart is accompanied by numerical indicators that specify the number of assignments past due out of the total number of assignments.

Below these panels, there is a detailed list, section 1508 that provides a breakdown of assignments by individual drivers. Each row in the list corresponds to a specific driver and includes columns for the driver's name, the number of assigned tasks, the number of incomplete tasks, the number of past due tasks, the number of completed tasks, and a visual progress bar that represents the completion progress for each driver. If the user selects one of the drivers, details about training for the selected driver are presented.

The visual progress bar shows the training completion percentage for the driver, which is the number of completed training courses divided by the number of all the training courses assigned to the driver. In other examples, a second visual progress bar may be presented (not shown) with the amount of repeated behaviors that occurred over time. Ideally, a decrease in these repeat behaviors is desired. The product allows customers to create their own training courses, with each driver's repeat events displayed. The goal is to observe a high percentage of completed courses and a reduction in the number of repeat behaviors per driver as the training progresses.

The BMS provides effective tools to track the number of events associated with each driver. This tracking allows for the identification of specific events linked to a driver and provides reports indicating the frequency of these events over a month-long period.

Furthermore, the BMS aims to assess the impact of training on driver behavior. The primary objective is to reduce negative behaviors through targeted training interventions. By generating reports that demonstrate a decrease in overall events following training, the system can effectively communicate the return on investment (ROI) to the customer.

Another report (not shown) may include information about coaching sessions, such as the number of behaviors coached on time, the number of total coachable behaviors, the average time codes, the number of past-due coaching sessions, etc. Additionally, a table may be provided by the driver to show the status of coaching sessions per driver.

FIG. 16 shows a UI 1602 for configuring the assignment of courses based on behavior, according to some examples. Any rule can be configured (such as the rules described above with reference to FIG. 12), basic rules and compound rules, and options are provided to the user to select the events or events associated with the rules, as well as number of events required to trigger, a window of time where the behavior is monitored, a frequency, or any other parameter.

The UI 1602 includes a variety of input and configuration fields for setting up and customizing a safety training course. At the top of the UI 1602, there is a section labeled "Safety" which includes an option to upload a course thumbnail image, specifically for "Driver Distractions." Below this, an input field for "Estimated Time to Complete" allows the user to specify the duration of the course, which, in this example, is set to ten minutes.

The next section, "Related Behaviors (Optional)," displays a series of selectable tags that describe behaviors related to the course content. The tags shown include "Inattentive Driving," "Eating/Drinking," and "Smoking." As indicated by the close icon on each tag, these tags can be individually removed.

Further down, the "Access" section provides options for selecting the geography where the course will be available, e.g., "Canada," "Mexico," and "United States" being the currently selected options. An additional optional section for "Feature Config" is present, with "Safety Training" entered as a configurable feature of the course.

The final section on the interface is "Course File Upload," which allows the user to upload course content in various supported formats, such as SCORM, AICC, xAPI, or cmi5 courses, using a .zip file. An example file named "Driver Distractions.zip" is shown as ready for upload.

Other options, not shown, allow the user to configure parameters for specific rules, including number of events to trigger, window of observation, etc.

Figure 17:
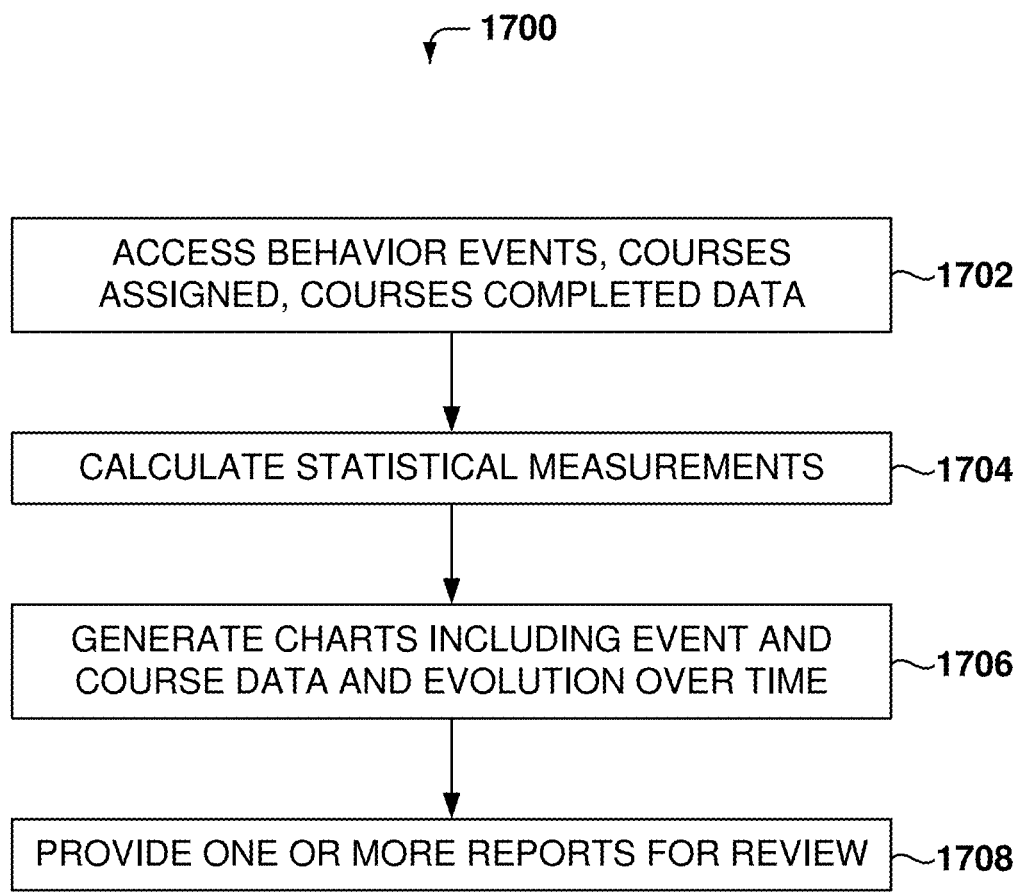
FIG. 17 is a flowchart of a method for generating a performance report, according to some examples.

FIG. 17 is a flowchart of a method 1700 for generating a performance report, according to some examples. While the various operations in this flowchart are presented and described sequentially, one of ordinary skill will appreciate that some or all of the operations may be executed in a different order, be combined or omitted, or be executed in parallel.

Operation 1702 is for accessing data regarding behavior events, courses assigned, and courses completed. Operation 1702 involves the retrieval of data related to user behavior, course assignments, and course completions. The purpose of this operation is to gather the necessary inputs for generating a comprehensive performance report.

From operation 1702, the method 1700 flows to operation 1704 for calculating statistical measurements. In operation 1704, the data accessed in the previous operation is analyzed to calculate various statistical metrics, such as averages, variances, completion rates, and other relevant statistics that provide insights into performance trends.

From operation 1704, the method 1700 flows to operation 1706 for generating charts, including event and course data and evolution over time. Operation 1706 involves creating visual representations of the data and statistics calculated in operation 1704. Charts and graphs are generated to illustrate the evolution of performance metrics over time, making it easier to understand trends and patterns.

From operation 1706, the method 1700 flows to operation 1708 for providing one or more reports for review. These reports are made available for stakeholders to review, providing a detailed account of performance based on the data collected and analyzed.

Figure 18:
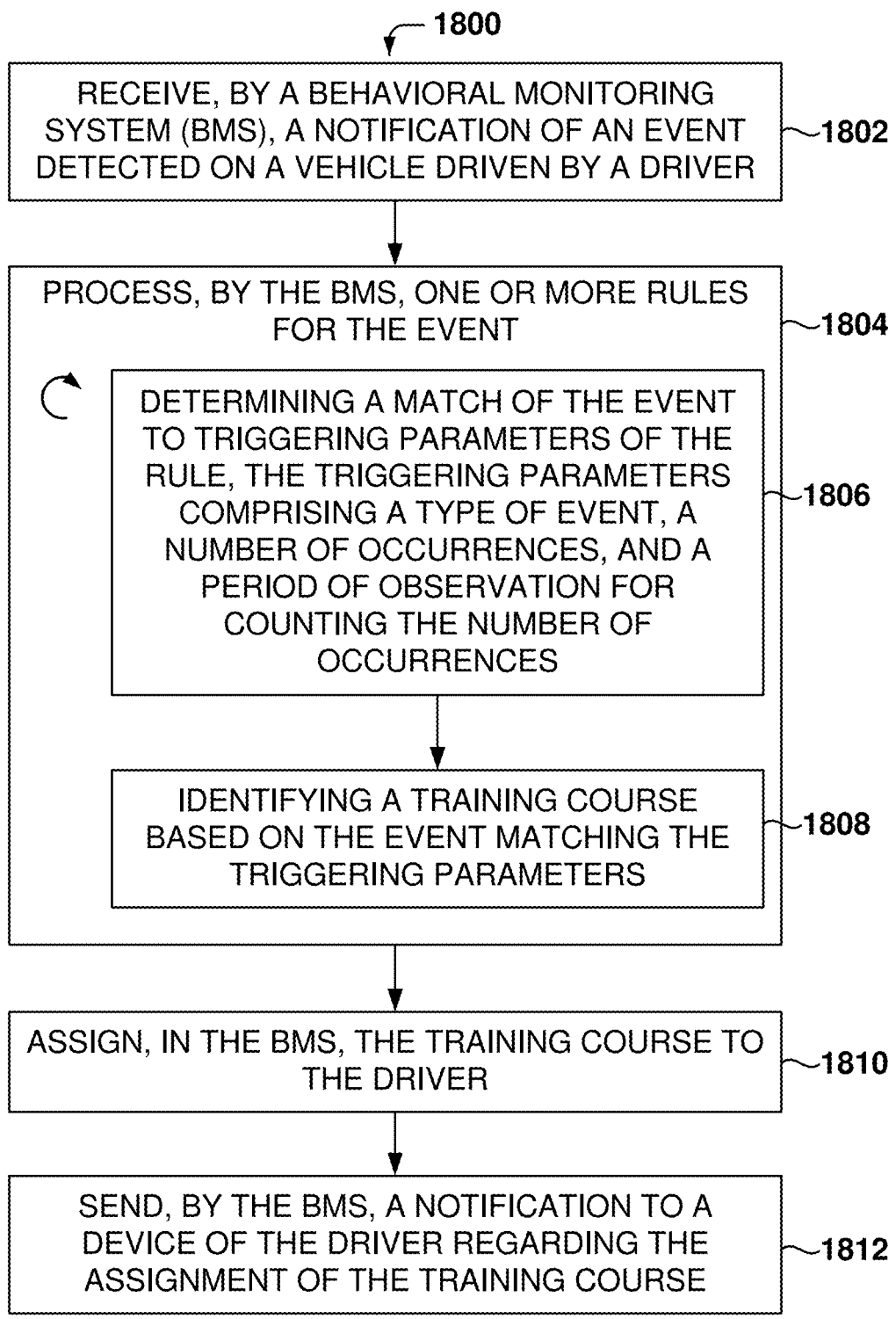
FIG. 18 is a flowchart of a method for the assignment of courses based on driver behavior, according to some examples.

FIG. 18 is a flowchart of a method 1800 for the assignment of courses based on driver behavior, according to some examples. While the various operations in this flowchart are presented and described sequentially, one of ordinary skill will appreciate that some or all of the operations may be executed in a different order, be combined or omitted, or be executed in parallel.

Operation 1802 is for receiving, by a behavioral monitoring system (BMS), a notification of an event detected on a vehicle driven by a driver.

From operation 1802, the method 1800 flows to operation 1804 for processing, by the BMS, one or more rules for the event. Processing each rule comprises operations 1806 and 1808.

Operation 1806 is for determining a match of the event to triggering parameters of the rule. The triggering parameters comprise a type of event, a number of occurrences, and a period of observation for counting the number of occurrences.

From operation 1806, the method 1800 flows to operation 1808 for identifying a training course based on the event matching the triggering parameters.

From operation 1804, the method 1800 flows to operation 1810 for assigning, in the BMS, the training course to the driver.

From operation 1810, the method 1800 flows to operation 1812 for sending, by the BMS, a notification to a device of the driver regarding the assignment of the training course.

In some examples, assigning the training course further comprises: providing, by the BMS, a UI for presenting a recommendation to assign the training course; receiving in the UI a selection to assign the training course; and recording the assignment in the BMS.

In some examples, assigning the training course further comprises: automatically assigning the training course in the BMS without requiring user input to assign the training course.

In some examples, a first rule is a basic rule that assigns the training course to the driver based on matching events of a single type.

In some examples, a second rule is a compound rule that assigns the training course based on detecting events of two or more different types.

In some examples, the method 1800 further comprises providing a UI to present information on received notifications of events for one or more drivers, the UI comprising an option to initialize a coaching session based on the received notifications of events.

In some examples, the method 1800 further comprises detecting, by the BMS, the completion of training courses for a plurality of drivers and generating a report based on the completed training courses.

In some examples, the first rule is for a speeding event, the first rule comprising triggering parameters of number of speeding events within a predetermined period of time.

In some examples, a second rule is for inattentive driving, the second rule comprising triggering parameters of number of inattentive-driving events within a predetermined period of time.

In some examples, a third rule is for a combination of speeding events and inattentive-driving events.

Another general aspect is for a system that includes a memory comprising instructions and one or more computer processors. The instructions, when executed by the one or more computer processors, cause the one or more computer processors to perform operations comprising: receiving, by a behavioral monitoring system (BMS), a notification of an event detected on a vehicle driven by a driver; processing, by the BMS, one or more rules for the event, wherein processing each rule comprises: determining a match of the event to triggering parameters of the rule, the triggering parameters comprising a type of event, a number of occurrences, and a period of observation for counting the number of occurrences; and identifying a training course based on the event matching the triggering parameters; assigning, in the BMS, the training course to the driver; and sending, by the BMS, a notification to a device of the driver regarding the assignment of the training course.

In yet another general aspect, a tangible machine-readable storage medium (e.g., a non-transitory storage medium) includes instructions that, when executed by a machine, cause the machine to perform operations comprising: receiving, by a behavioral monitoring system (BMS), a notification of an event detected on a vehicle driven by a driver; processing, by the BMS, one or more rules for the event, wherein processing each rule comprises: determining a match of the event to triggering parameters of the rule, the triggering parameters comprising a type of event, a number of occurrences, and a period of observation for counting the number of occurrences; and identifying a training course based on the event matching the triggering parameters; assigning, in the BMS, the training course to the driver; and sending, by the BMS, a notification to a device of the driver regarding the assignment of the training course.

Figure 19:
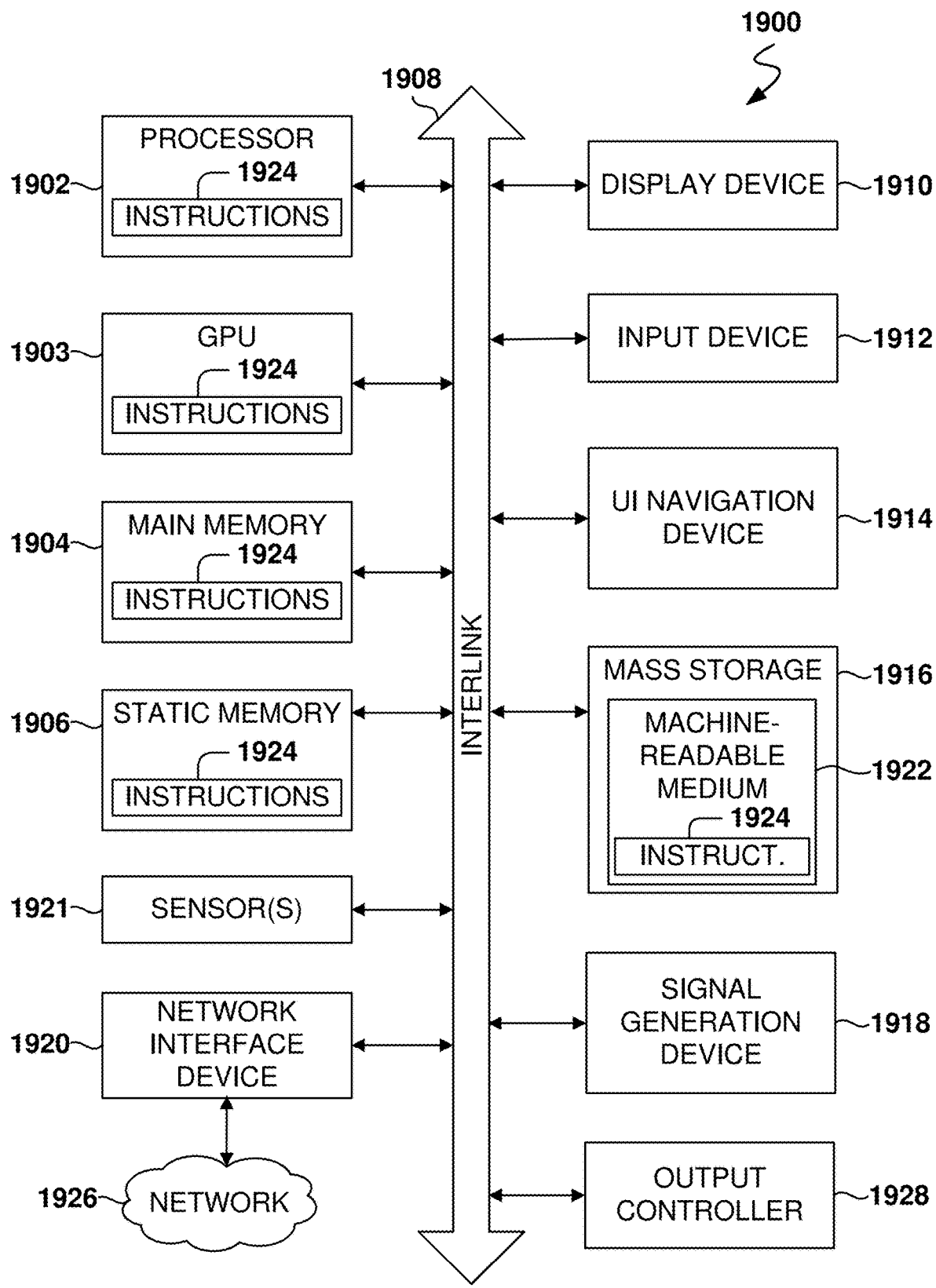
FIG. 19 is a block diagram illustrating an example of a machine upon or by which one or more example process examples described herein may be implemented or controlled.

FIG. 19 is a block diagram illustrating an example of a machine 1900 upon or by which one or more example process examples described herein may be implemented or controlled. In alternative examples, the machine 1900 may operate as a standalone device or be connected (e.g., networked) to other machines. In a networked deployment, the machine 1900 may operate in the capacity of a server machine, a client machine, or both in server-client network environments. In an example, the machine 1900 may act as a peer machine in a peer-to-peer (P2P) (or other distributed) network environment. Further, while only a single machine 1900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1900 (e.g., computer system) may include a hardware processor 1902 (e.g., a central processing unit (CPU), a hardware processor core, or any combination thereof), a graphics processing unit (GPU 1903), a main memory 1904, and a static memory 1906, some or all of which may communicate with each other via an interlink 1908 (e.g., bus). The machine 1900 may further include a display device 1910, an alphanumeric input device 1912 (e.g., a keyboard), and a user interface (UI) navigation device 1914 (e.g., a mouse). In an example, the display device 1910, the alphanumeric input device 1912, and UI navigation device 1914 may be a touch screen display. The machine 1900 may additionally include a mass storage device 1916 (e.g., drive unit), a signal generation device 1918 (e.g., a speaker), a network interface device 1920, and one or more sensors 1921, such as a Global Positioning System (GPS) sensor, compass, accelerometer, or another sensor. The machine 1900 may include an output controller 1928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1902 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1902 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1902 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1902 may be emulated in software, running on a physical processor, as a virtual processor or virtual circuit. The virtual processor may behave like an independent processor but is implemented in software rather than hardware.

The mass storage device 1916 may include a machine-readable medium 1922 on which one or more sets of data structures or instructions 1924 (e.g., software) embodying or utilized by any of the techniques or functions described herein. The instructions 1924 may also reside, completely or at least partially, within the main memory 1904, within the static memory 1906, within the hardware processor 1902, or the GPU 1903 during execution thereof by the machine 1900. For example, one or any combination of the hardware processor 1902, the GPU 1903, the main memory 1904, the static memory 1906, or the mass storage device 1916 may constitute machine-readable media.

While the machine-readable medium 1922 is illustrated as a single medium, the term "machine-readable medium" may include a single medium or multiple media (e.g., a centralized or distributed database and associated caches and servers) configured to store one or more instructions 1924.

The term "machine-readable medium" may include any medium that is capable of storing, encoding, or carrying instructions 1924 for execution by the machine 1900 and that causes the machine 1900 to perform any one or more of the techniques of the present disclosure or that is capable of storing, encoding, or carrying data structures used by or associated with such instructions 1924. Non-limiting machine-readable medium examples may include solid-state memories and optical and magnetic media. For example, a massed machine-readable medium comprises a machine-readable medium 1922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1924 may be transmitted or received over a communications network 1926 using a transmission medium via the network interface device 1920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
receiving, by a behavioral monitoring system (BMS), a notification of an event detected on a vehicle driven by a driver;
processing, by the BMS, one or more rules for the event, wherein processing each rule comprises:
determining a match of the event to triggering parameters of the rule, the triggering parameters comprising a type of event, a number of occurrences, and a period of observation for counting the number of occurrences; and
identifying a training course from a plurality of training courses based on the event matching the triggering parameters, wherein the training course comprises one or more training videos and the training course is performed without arranging and conducting face-to-face training;
assigning, in the BMS, the training course to the driver; and
sending, by the BMS, a notification to a device of the driver regarding the assignment of the training course, wherein the device of the driver provides an option for completing the training course in the device of the driver.

2. The method as recited in claim 1, wherein assigning the training course further comprises:
providing, by the BMS, a UI for presenting one or more training courses from the plurality of training courses that may be assigned to the driver;
receiving in the UI a selection of a first training course, from the plurality of training courses, to assign to the driver; and
recording the assignment of the first training course to the driver in the BMS.

3. The method as recited in claim 1, wherein assigning the training course further comprises:
automatically assigning the training course to the driver in the BMS without requiring user input to assign the training course.

4. The method as recited in claim 1, wherein a first rule is a basic rule that assigns the training course to the driver based on matching events of a single type.

5. The method as recited in claim 1, wherein a second rule is a compound rule that assigns the training course based on detecting events of two or more different types.

6. The method as recited in claim 1, further comprising:
providing a UI to present information on received notifications of events for one or more drivers, the UI comprising an option to initialize a coaching session based on the received notifications of events.

7. The method as recited in claim 1, further comprising:
detecting, by the BMS, completion of training courses for a plurality of drivers; and
generating a report based on the completed training courses.

8. The method as recited in claim 1, wherein a first rule is for a speeding event, the first rule comprising triggering parameters of number of speeding events within a predetermined period of time.

9. The method as recited in claim 1, wherein a second rule is for inattentive driving, the second rule comprising triggering parameters of number of inattentive-driving events within a predetermined period of time.

10. The method as recited in claim 1, wherein a third rule is for a combination of speeding events and inattentive-driving events.

11. A system comprising:
a memory comprising instructions; and
one or more computer processors, wherein the instructions, when executed by the one or more computer processors, cause the system to perform operations comprising:
receiving, by a behavioral monitoring system (BMS), a notification of an event detected on a vehicle driven by a driver;
processing, by the BMS, one or more rules for the event, wherein processing each rule comprises:
determining a match of the event to triggering parameters of the rule, the triggering parameters comprising a type of event, a number of occurrences, and a period of observation for counting the number of occurrences; and
identifying a training course from a plurality of training courses based on the event matching the triggering parameters, wherein the training course comprises one or more training videos and the training course is performed without arranging and conducting face-to-face training;
assigning, in the BMS, the training course to the driver; and
sending, by the BMS, a notification to a device of the driver regarding the assignment of the training course, wherein the device of the driver provides an option for completing the training course in the device of the driver.

12. The system as recited in claim 11, wherein assigning the training course further comprises:
providing, by the BMS, a UI for presenting one or more training courses from the plurality of training courses that may be assigned to the driver;
receiving in the UI a selection of a first training course, from the plurality of training courses, to assign to the driver; and
recording the assignment of the first training course to the driver in the BMS.

13. The system as recited in claim 11, wherein assigning the training course further comprises:
automatically assigning the training course to the driver in the BMS without requiring user input to assign the training course.

14. The system as recited in claim 11, wherein a first rule is a basic rule that assigns the training course to the driver based on matching events of a single type.

15. The system as recited in claim 11, wherein a second rule is a compound rule that assigns the training course based on detecting events of two or more different types.

16. A non-transitory machine-readable storage medium including instructions that, when executed by a machine, cause the machine to perform operations comprising:
receiving, by a behavioral monitoring system (BMS), a notification of an event detected on a vehicle driven by a driver;
processing, by the BMS, one or more rules for the event, wherein processing each rule comprises:
determining a match of the event to triggering parameters of the rule, the triggering parameters comprising a type of event, a number of occurrences, and a period of observation for counting the number of occurrences; and identifying a training course from a plurality of training courses based on the event matching the triggering parameters, wherein the training course comprises one or more training videos and the training course is performed without arranging and conducting face-to-face training;

assigning, in the BMS, the training course to the driver; and sending, by the BMS, a notification to a device of the driver regarding the assignment of the training course, wherein the device of the driver provides an option for completing the training course in the device of the driver.

17. The non-transitory machine-readable storage medium as recited in claim 16, wherein assigning the training course further comprises:

providing, by the BMS, a UI for presenting one or more training courses from the plurality of training courses that may be assigned to the driver;

receiving in the UI a selection of a first training course, from the plurality of training courses, to assign to the driver; and recording the assignment of the first training course to the driver in the BMS.

18. The non-transitory machine-readable storage medium as recited in claim 16, wherein assigning the training course further comprises:

automatically assigning the training course to the driver in the BMS without requiring user input to assign the training course.

19. The non-transitory machine-readable storage medium as recited in claim 16, wherein a first rule is a basic rule that assigns the training course to the driver based on matching events of a single type.

20. The non-transitory machine-readable storage medium as recited in claim 16, wherein a second rule is a compound rule that assigns the training course based on detecting events of two or more different types.

* * * * *